United States Patent
Xia et al.

(10) Patent No.: US 10,063,290 B2
(45) Date of Patent: Aug. 28, 2018

(54) METHODS AND PROCEDURES FOR NON-LINEAR PRECODING BASED MULTIUSER MULTIPLE INPUT MULTIPLE OUTPUT

(71) Applicant: InterDigital Patent Holdings, Inc., Wilmington, DE (US)

(72) Inventors: Pengfei Xia, San Diego, CA (US); Oghenekome Oteri, San Diego, CA (US); Nirav B. Shah, San Diego, CA (US); Monisha Ghosh, Chicago, IL (US); Hanqing Lou, Syosset, NY (US); Robert L. Olesen, Huntington, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 72 days.

(21) Appl. No.: 14/777,158

(22) PCT Filed: Mar. 13, 2014

(86) PCT No.: PCT/US2014/025966
§ 371 (c)(1),
(2) Date: Sep. 15, 2015

(87) PCT Pub. No.: WO2014/151546
PCT Pub. Date: Sep. 25, 2014

(65) Prior Publication Data
US 2016/0043783 A1 Feb. 11, 2016

Related U.S. Application Data

(60) Provisional application No. 61/794,149, filed on Mar. 15, 2013.

(51) Int. Cl.
*H04B 7/00* (2006.01)
*H04B 7/0417* (2017.01)
(Continued)

(52) U.S. Cl.
CPC ........ *H04B 7/0417* (2013.01); *H04B 7/0452* (2013.01); *H04B 7/0456* (2013.01); *H04B 7/0626* (2013.01)

(58) Field of Classification Search
CPC ... H04W 40/24; H04W 76/02; H04W 76/025; H04W 76/04; H04W 92/04; H04W 92/10
(Continued)

(56) References Cited

U.S. PATENT DOCUMENTS 7,986,755 B2 * 7/2011 Tung .................... H04B 7/0417 375/316
8,199,841 B1 * 6/2012 Sarrigeorgidis ........ H04L 1/005 375/267

(Continued)

FOREIGN PATENT DOCUMENTS

JP 2009-273186 11/2009
JP 2011-254183 A 12/2011
(Continued)

OTHER PUBLICATIONS

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, 103 pages.
(Continued)

*Primary Examiner* — Dmitry H Levitan
(74) *Attorney, Agent, or Firm* — Volpe and Koenig, P.C.

(57) ABSTRACT

A station is used to implement non-linear coding based multiuser multiple-input multiple-output (MU-MIMO). The station includes a processor that may be configured to
(Continued)

perform a number of actions. For example, the processor receives a null packet from an access point (AP). Channel feedback is generated using the null packet. The channel feedback is sent to the AP. QR dependent information is received from the AP. Data is sent to the AP according to the QR dependent information.

20 Claims, 25 Drawing Sheets

(51) Int. Cl.
    *H04B 7/0452*     (2017.01)
    *H04B 7/06*     (2006.01)
    *H04B 7/0456*     (2017.01)

(58) Field of Classification Search
    USPC ............... 370/310, 312, 329, 349, 464, 465
    See application file for complete search history.

(56) References Cited

U.S. PATENT DOCUMENTS

| | | | |
|---|---|---|---|
| 8,483,761 B2* | 7/2013 | Li | H04B 7/0413 455/273 |
| 8,559,571 B2* | 10/2013 | Tung | H04B 7/0413 375/346 |
| 8,792,576 B2* | 7/2014 | Kuwahara | H04L 27/34 375/267 |
| 8,824,386 B2* | 9/2014 | Pare, Jr. | H04B 7/0452 370/329 |
| 8,982,980 B2* | 3/2015 | Zhang | H04B 7/0634 375/219 |
| 9,048,895 B2* | 6/2015 | Kim | H04B 7/0417 |
| 9,420,604 B2* | 8/2016 | Hwang | H04B 7/0417 |
| 9,621,239 B2* | 4/2017 | Baligh | H04L 25/03949 |
| 2003/0012175 A1* | 1/2003 | Sebire | H04B 7/2659 370/347 |
| 2006/0120478 A1 | 6/2006 | Kim et al. | |
| 2008/0219369 A1* | 9/2008 | Wu | H04L 1/0002 375/260 |
| 2008/0233968 A1 | 9/2008 | Hwang et al. | |
| 2009/0323840 A1 | 12/2009 | Lee et al. | |
| 2011/0058599 A1 | 3/2011 | Gaur | |
| 2011/0075607 A1 | 3/2011 | Kim et al. | |
| 2011/0274002 A1* | 11/2011 | Pare, Jr. | H04B 7/0452 370/252 |
| 2012/0020226 A1 | 1/2012 | Trainin et al. | |
| 2012/0033566 A1* | 2/2012 | Porat | H04L 25/0248 370/252 |
| 2013/0136050 A1 | 5/2013 | Tomeba et al. | |
| 2014/0204841 A1 | 7/2014 | Delgado et al. | |

FOREIGN PATENT DOCUMENTS

| | | |
|---|---|---|
| JP | 2012-533971 | 12/2012 |
| JP | 2013-505645 | 2/2013 |
| WO | WO 2011-035204 A2 | 3/2011 |
| WO | WO 2012-033931 | 3/2012 |
| WO | WO 2012-119127 | 9/2012 |
| WO | WO 2013-024838 A1 | 2/2013 |

OTHER PUBLICATIONS

Chen et al., "MAC and PHY Proposal for 802.11af", IEEE 802.11-10/0258r0, Mar. 2010, 23 pages.

Erceg et al., "TGn Channel Models", IEEE P802.11 Wireless LANs, IEEE 802.11-03/940r4, May 10, 2004, 45 pages.

Halasz, Dave, "Sub 1 GHz License-Exempt PAR and 5C", IEEE 802.11-10/0001r13, Jul. 15, 2010, 8 pages.

Hochwald et al., "A Vector-Perturbation Technique for Near-Capacity Multiantenna Multiuser Communication; Part II: Perturbation", IEEE Transactions on Communications, vol. 53, No. 3, 2005, 24 pages.

Horn et al., "Matrix Analysis", Cambridge University Press, New York, NY, USA, 1985.

IEEE, "Draft Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications—Amendment 4: Enhancements for Very High Throughput for Operation in Bands below 6 GHz", IEEE P802.11ac™/D3.1, Aug. 2012.

IEEE, "Draft Standard for Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", IEEE P802.11ad/D8.0, May 2012, 664 pages.

IEEE, "Part 11: Wireless LAN Medium Access Control (MAC) and Physical Layer (PHY) Specifications", IEEE Std. 802.11-REVmb/D12, Nov. 2011, 2910 pages.

Liu et al., "Improved Tomlinson-Harashima Precoding for the Downlink of Multi-User MIMO Systems", IEEE Wireless Communications and Networking Conference, 2005.

Peel et al., "A Vector Perturbation Technique for Near-Capacity Multiantenna Multiuser Communication, Part I: Channel Inversion and Regularization", IEEE Transactions on Communications, vol. 53, No. 1, 2005, 8 pages.

Sadek et al., "A Leakage-Based Precoding Scheme for Downlink Multi-User MIMO Channels", IEEE Transactions on Wireless Communications, vol. 6, No. 5, May 2007, 11 pages.

Spencer et al., "An Introduction to the Multi-User MIMO Downlink", IEEE Communications Magazine, vol. 42, No. 10, Oct. 2004, 8 pages.

Spencer et al., "Zero-Forcing Methods for Downlink Spatial Multiplexing in Multiuser MIMO Channels", IEEE Transactions on Signal Processing, vol. 52, No. 2, Feb. 2004, 11 pages.

Windpassinger et al., "Lattice-Reduction-Aided Broadcast Precoding", IEEE Transactions on Communications, vol. 52, No. 12, 2004, 6 pages.

\* cited by examiner $$\begin{bmatrix} 0.3528 + 0.0005i & -0.4014 + 0.3253i & 0.8149 + 0.4675i & 0.6364 - 0.2249i \\ -0.2165 - 0.5656i & 0.5818 - 0.6681i & 0.7785 - 1.2000i & 1.5394 - 0.1347i \\ 0.5099 + 0.1046i & -0.0759 - 0.3492i & 0.6284 - 0.2318i & 0.5236 - 0.1302i \\ -0.9177 + 0.1287i & -0.5142 - 0.3237i & -1.3922 - 0.1066i & -1.3917 - 0.6040i \end{bmatrix}$$
FIG. 12(a)
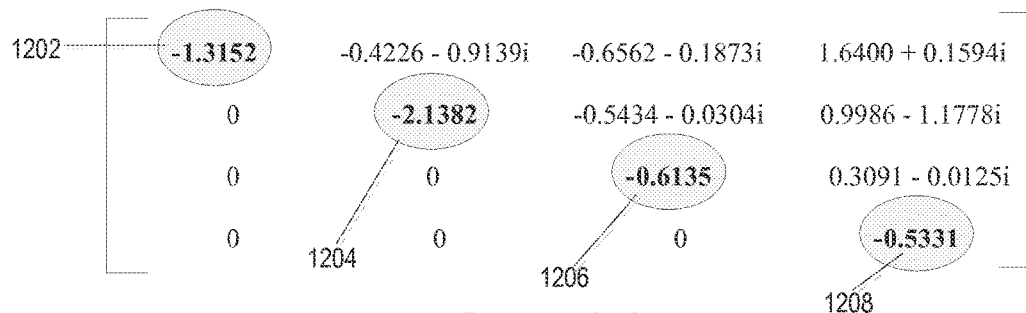
FIG. 12(b)
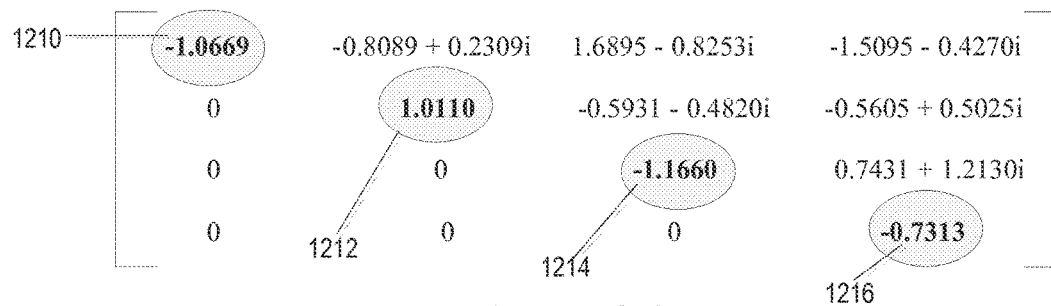
FIG. 12(c)
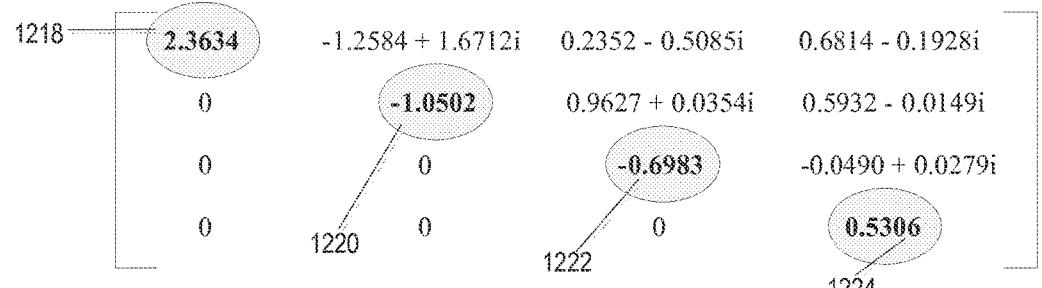
FIG. 12(d)

FIG. 18

| 2302 # of users | 2304 User index (STA addr) | 2314 Quantization resolution | 2306 Signaling content | ...... | 2308 User index (STA addr) | 2310 Quantization resolution | 2312 Signaling content |

FIG. 23

METHODS AND PROCEDURES FOR NON-LINEAR PRECODING BASED MULTIUSER MULTIPLE INPUT MULTIPLE OUTPUT

CROSS REFERENCE TO RELATED APPLICATIONS

This application is the National Stage Entry under 35 U.S.C. § 371 of Patent Cooperation Treaty Application No. PCT/US14/25966, filed Mar. 13, 2014, which claims the benefit of U.S. Provisional Application No. 61/794,149, filed Mar. 15, 2013, the contents of which are hereby incorporated by reference herein.

BACKGROUND

Due to an increasing demand for wireless communication services and bandwidth capacities, wireless networks, for example wireless local area networks (WLANs) may use multiple-input multiple-output (MIMO) technologies. MIMO antennas may offer improved data throughput and link range. However, performance of existing MIMO technologies may be inadequate.

SUMMARY

Disclosed herein are systems, methods, and apparatus that may be used to implement non-linear coding based multiuser multiple-input multiple-output (MU-MIMO). For example, a station may be used to receive non-linear coded MU-MIMO transmissions. The station may include a processor that may be configured to perform a number of actions. The processor may receive a null packet from an access point (AP). Channel feedback may be generated using the null packet. The channel feedback may be sent to the AP. QR dependent information may be received from the AP. Data may be sent to the AP according to the QR dependent information.

As another example, an access point (e.g. a non-STA, a relay, or the like) may be used to implement non-linear coding based MU-MIMO. The access point may include a processor that may be configured to perform a number of actions. The processor may send a null packet. A first feedback may be received from a first station and a second feedback may be received from a second station. QR dependent information may be determined using the first feedback and the second feedback. The QR dependent information may be sent to the first station. A multi-user data stream may be received.

The Summary is provided to introduce a selection of concepts in a simplified form that are further described in the Detailed Description. This Summary is not intended to identify key or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 12(a) illustrates an exemplary aggregated channel from an AP to four STAs.

FIG. 12(b) illustrates exemplary effective channels with no ordering by the highlighted entries.

FIG. 12(c) illustrates exemplary the effective channels with min-norm ordering.

FIG. 12(d) illustrates the effective channels with max-norm ordering.

FIG. 18 illustrates an exemplary extended demapping.

FIG. 23 illustrates an exemplary explicit signaling frame format.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Disclosed herein are systems, methods, and apparatus that may be used to implement non-linear coding based multiuser multiple-input multiple-output (MU-MIMO). For example, a station may be used to implement non-linear coded based MU-MIMO transmissions. The station may include a processor that may be configured to perform a number of actions. The processor may receive a null packet from an access point (AP). Channel feedback may be generated using the null packet. The channel feedback may be sent to the AP. QR dependent information may be received from the AP. Data may be sent to the AP according to the QR dependent information.

As another example, an access point may be used to implement non-linear coding based MU-MIMO. The access point may include a processor that may be configured to perform a number of actions. The processor may send a null packet. A first feedback may be received from a first station and a second feedback may be received from a second station. QR dependent information may be determined using the first feedback and the second feedback. The QR dependent information may be sent to the first station. A multi-user data stream may be received.

Figure 1:
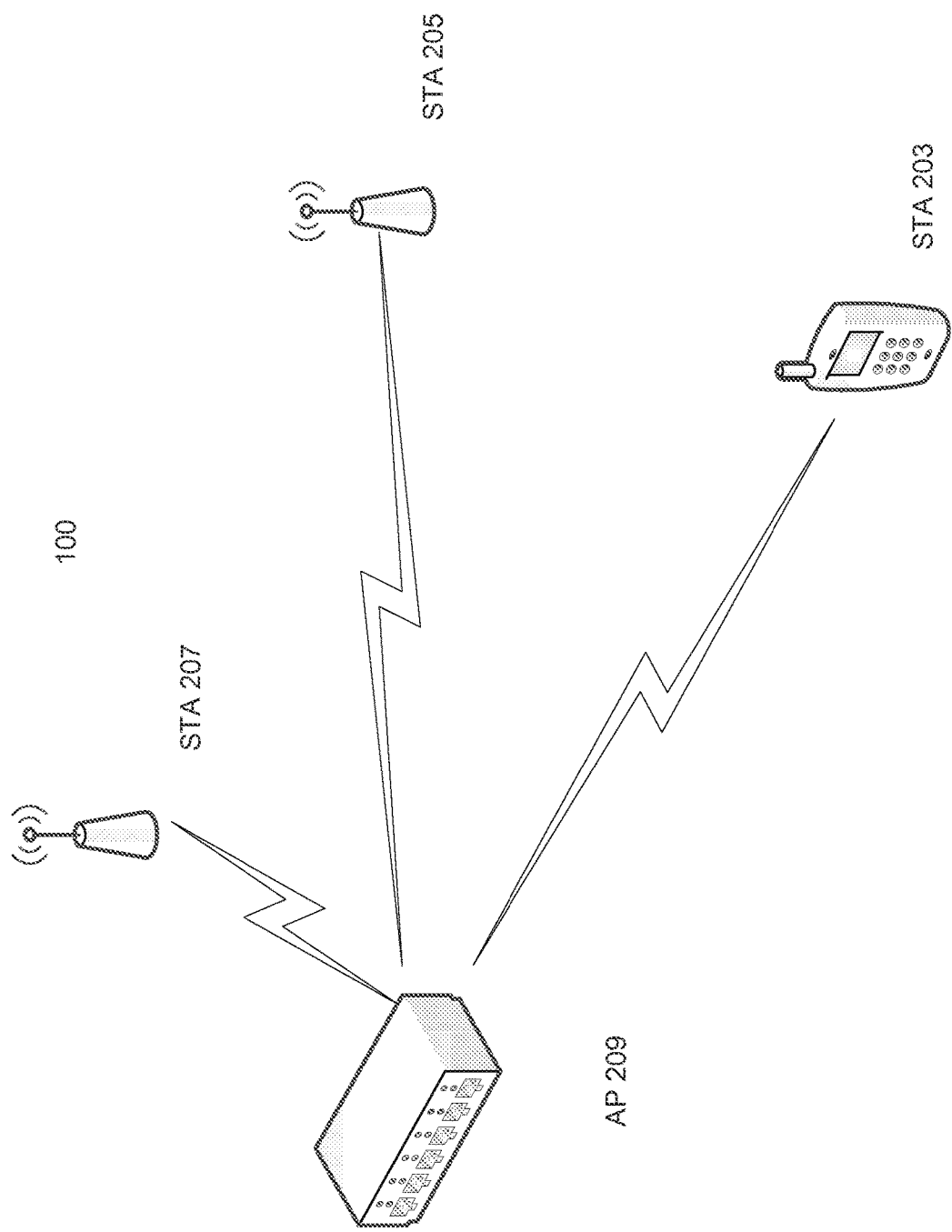
FIG. 1 illustrates an exemplary multi-user transmission from a single access point (AP) to multiple stations (STAs).

FIG. 1 illustrates an exemplary multi-user transmission from a single access point (AP) to multiple stations (STAs). As shown in FIG. 1, wireless local area network (WLAN) 100 may be in an infrastructure basic service set (IBSS) mode. The WLAN may have an access point (AP) for a basic service set (BSS). One or more stations (STAs) may be in communication with the AP. For example, STA 207, STA 205, and/or STA 203 may be in communication with AP 209.

An AP, such as AP 209, may have access or interface to a wired or wireless network, such as a distribution system (DS), that may carry traffic into and out of the BSS. A STA, such as STA 205, may receive traffic via an AP. For example, traffic from outside the BBS may arrive at AP 209 and AP 209 may deliver the traffic to STA 205. A STA may send traffic to destinations outside the BSS via the AP. For example, STA 205 may send traffic to AP 102 and AP 102 may deliver the traffic to a destination outside the BSS.

Traffic between STAs within the BSS may be sent via the AP. For example, STA 205 may send traffic to AP 209 and the AP 209 may deliver the traffic to STA 203. The traffic between STAs within a BSS may be peer-to-peer traffic. Peer-to-peer traffic may be sent directly between a source STA and a destination STA using, for example, a direct link setup (DLS) such as an IEEE 802.11e DLS, an IEEE 802.11z tunneled DLS (TDLS), or the like. A WLAN using an IBSS mode may not have an AP and the STAs may communicate directly with each other. This mode of communication may be referred to as an ad-hoc mode.

Using the IEEE 802.11 infrastructure mode of operation, AP 209 may transmit a beacon on a channel, which may be a primary channel. The channel may be 20 MHz wide, and may be the operating channel of the BSS. The channel may be used by the STAs to establish a connection with AP 209. For example, STA 205 may use the channel to establish a connection with AP 209. When using the IEEE 802.11 infrastructure mode, channel access may be Carrier Sense Multiple Access with Collision Avoidance (CSMA/CA). When using CSMA/CA an STA and/or an AP may sense the primary channel. If the channel is detected to be busy, the STA or AP may back off. This may be done, for example, to avoid collisions by allow a STA or an AP to transmit within a BBS when the channel is free.

WLAN 100 may use IEEE 802.11AC, or a later amendment to it. A STA, such as STA 207, STA 205, and STA 203 may be a very high throughput (VHT) STA. In IEEE 802.11ac, a VHT STA may support, e.g., 20 MHz, 40 MHz, 80 MHz, and/or 160 MHz wide channels. The 40 MHz, and 80 MHz, channels may be formed, for example, by combining contiguous 20 MHz channels. A 160 MHz channel may be formed, for example, by combining eight contiguous 20 MHz channels, or by combining two non-contiguous 80 MHz channels (which may be referred to as an 80+80 configuration). For an 80+80 configuration, the data may be passed through a segment parser that may divide it into two streams. Inverse fast Fourier transform (IFFT) and/or time domain processing may be performed on a stream. The streams may be mapped onto two channels and the data may be transmitted. At the receiver, this mechanism may be reversed, and the combined data may be sent to the media access control (MAC).

WLAN 100 may use IEEE 802.11af, IEEE 802.11ah, or similar sub-6 GHz specification. IEEE 802.11af and IEEE 802.11ah may support sub 1 GHz modes of operation. For these specifications, the channel operating bandwidths reduced relative to those used in IEEE 802.11n, and IEEE 802.11ac. IEEE 802.11af may support 5 MHz, 10 MHz and/or 20 MHz bandwidths in the TV White Space (TVWS) spectrum. IEEE 802.11ah may support 1 MHz. 2 MHz, 4 MHz, 8 MHz, and/or 16 MHz bandwidths, for example, using non-TVWS spectrum. IEEE 802.11ah may support Meter Type Control (MTC) devices in a macro coverage area. MTC devices may have capabilities including, for example, support for limited bandwidths, and long battery life.

WLAN 100 may support multiple channels and/or channel widths using, for example, IEEE 802.11n, IEEE 802.11ac, IEEE 802.11af, IEEE 802.11ah, and/or a later amendment. WLAN 100 may include a channel that may be designated as a primary channel. The bandwidth of the primary channel may be set according to the ability of one or more STA(s). For example, the primary channel may have a bandwidth that may be equal to a common operating bandwidth supported by the STAs in the BSS. As another example, the primary channel may have a bandwidth that may support the smallest bandwidth operating mode of the STAs in the BSS. For example, in IEEE 802.11ah, the primary channel may be 1 MHz wide when there may be a STA (such as a MTC type devices) that may support a 1 MHz mode. This may occur even though other APs and/or STAs in the BSS may support other channel bandwidth operating mode, such as a 2 MHz mode, a 4 MHz mode, a 8 MHz mode, a 16 MHz mode, or the like. The carrier sensing, and network allocation vector (NAV) settings, may depend on the status of the primary channel. If the primary channel is busy, for example, due to a STA supporting a 1 MHz operating mode transmitting to the AP, the available frequency bands may be considered busy even though the bands may be available.

The bandwidth available for IEEE 802.11ah may be 6 MHz to 26 MHz and may depend on the country code. For example, in the United States the available frequency bands that may be used by IEEE 802.11ah may be from 902 MHz to 928 MHz. As another example, in Korea it may be from 917.5 MHz to 923.5 MHz. As another example, in Japan it may be from 916.5 MHz to 927.5 MHz.

Downlink multi-user (MU) multiple input multiple output (MIMO) transmissions, such as downlink MU IEEE 802.11ac based transmission, may support multiple users. For example, downlink MU transmissions may support four users. Downlink MU-MIMO may support multiple space-time streams (STS), such as eight STS, and may allow a user to support multiple STS, such as four STS. Downlink MU-MIMO may be considered, for example, where receivers for a user may be separate from the receivers of other users and may not be able to cooperate with each other. Transmitters for a user (for example, a STA) may be co-located at an AP and may be able to cooperate with each other.

In DL-MU-MIMO in IEEE 802.11ac, there may be eight streams transmitted from a beamformer, which may be an AP, and the space-time streams may be divided between one or more STAs. For example, referring to FIG. 1. AP 209 may transmit eight STS and STA may receive four STS. IEEE 802.11ac may use a linear precoding at the transmitter, such as at AP 209. A received signal vector at a beamformee, which may be a STA such as STA 207, may be separable from the signals transmitted to other STAs. The linear precoder may be designed to minimize interference between multiple STAs. For example, for a STA u on subcarrier k, with $N_{Rx_u}$ receive antennas, the received signal may be written as, $$y_{k,u} = H_{k,u} Q_{k,u} X_k + n_u$$

where $y_{k,u}$ may be an $N_{Rx_u} \times 1$ vector representing the received signal at STA u, $H_{k,u}$ may be an $N_{Rx_u} \times N_{Tx}$ matrix representing the channel matrix from AP to STA to STA u, $Q_{k,u}$ may be an $N_{Tx} \times N_{STS,u}$ steering matrix for user u, $X_k$ may be an $N_U \times 1$ vector (for example, where $N_U$ may be the total number of STS for each of the transmitted users $\Sigma_u N_{STS,u}$) representing the data transmitted to each of the users on subcarrier k and n may be an $N_{Rx_u} \times 1$ vector representing the additive white noise (and interference) for user u. A DL-MU-MIMO steering matrix ($Q_k$) may be derived using beamforming feedback, which may include the signal-to-noise ratio (SNR) information for a subcarrier.

Signaling information may be indicated in the VHT preamble. This may ensure that a STA may be able to decode a STS that may be meant for it. The signaling information may include a parameter indicating the packet may be a MU-transmission, a group-ID indicating the beamformees or STAs that belong to a group for a MU-MIMO STA addresses within the group, relative positions of STS, number of STS, a modulation and coding schemes (MCS) used for a STA, or the like.

Using this or similar signaling, the STA STS ordering may be similar across a transmission bandwidth. For example, a STA's ordering on sub-carrier n may match the ordering on sub-carrier m. As a STA may be able to identify the STS intended for other interfering STAs and may be able to estimate the channel, the STA may use attempt to reduce the effect of interference from other STAs.

To enable an AP, which may be a beamformer, to calculate the preferred steering matrix, one or more STAs in an addressed group may send feedback to the AP about the channel state measured at the STA's location. A compressed beamforming feedback method, such as a Given's rotation method, may be used. Upon receipt of a VHT null data packet sounding physical (PHY) layer convergence procedure Protocol Data Unit (PPDU), a beamformee may feed back the channel, and an associated SNR, using a codebook phase quantization level, such as the codebook phase quantization level defined in 8-53c of the 802.11ac specification.

A precoding steering matrix design and signaling may be provided. The MU-MIMO precoding used for calculation of the steering matrix may be linear. The MU-MIMO precoding may assume may be assumed that $N_{Tx} > N_{Rx_u}$. The MU-MIMO precoding may include a zero forcing MU-MIMO, a regularized channel inversion, a block diagonalization, a leakage based precoding, or the like.

A zero forcing MU-MIMO may be used. $N_{Rx_u} = 1$ (e.g., a receive antenna or stream) may be assumed for each of the STAs. The steering matrix Q may be calculated as:

$$Q = H^H (HH^H)^{-1}$$

where H may be the composite channel from the AP to the associated STAs. The interference between STAs may be eliminated by using a linear precoder.

A regularized channel inversion may be used. $N_{Rx_u} = 1$ may be assumed for each of the STAs. The steering matrix Q may be calculated as:

$$Q = H^H (HH^H + \alpha 1)^{-1}, \alpha = K/\rho$$

where H may be the composite channel from the AP to each of the STAs, K may be the number of STAs and $\rho$ may be the operating SNR. A level of residual interference between STAs may be allowed.

A block diagonalization may be used. $N_{Rx_u} > 1$ may be assumed and each receiver may be allowed to orthogonally coordinate its processing between antennas. A leakage based precoding may be used. $N_{Rx_u} > 1$ may be assumed and interference between STAs may be allowed. A precoding may be used at a transmitter.

NL MU-MIMO may be provided. The sum-rate capacity of a downlink MU-MIMO system may be achieved by using dirty paper coding (DPC). DPC may be a non-linear precoding technique. A modulo operation may be used to reduce the complexity of implementing a DPC in a wireless system. For example, a modulo operation may be utilized in non-linear precoding for a MU-MIMO system.

An implementation of non-linear DPC may result in a QAM symbol that may be transmitted outside constellation boundaries, which may increase the overall transmit power of the transmitted signal. A modulo operation may be used at a transmitter and at a receivers to map a resulting signal back within the boundaries of the original constellation.

Figure 2:
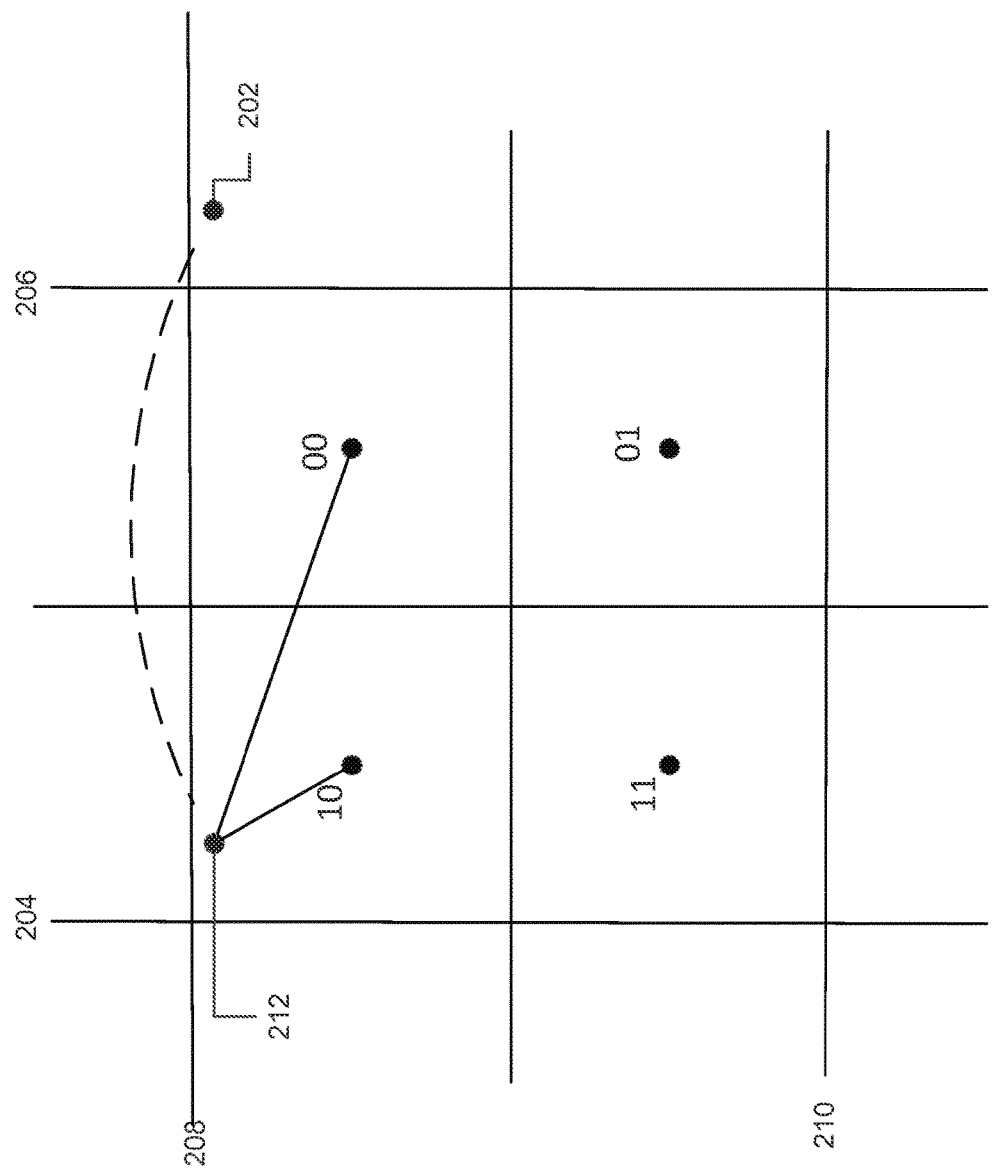
FIG. 2 illustrates an exemplary modulo operation for quadrature phase shift keying (QPSK).

FIG. 2 illustrates an exemplary modulo operation for quadrature phase shift keying (QPSK). As shown in FIG. 2 a non-linear operation may result in a transmit signal outside constellation boundaries 204, 206, 208, and/or 210. For example, at 202, a non-linear operation may have resulted in the transmit signal being outside constellation boundary 206 and constellation boundary 208. A modulo operation may result in a transmit signal within constellation boundaries 204, 206, 208, and/or 210. For example, at 212, a modulo operation may result in a transmit signal within constellation boundaries 204, 206, 208, and/or 210.

A modulo operation may be defined for each real or imaginary dimension of a constellation as $$\mod(a, \tau) = a - \left\lfloor \frac{a + \frac{\tau}{2}}{\tau} \right\rfloor \tau,$$

$$\tau = 2(|d_{max}| + \Delta/2),$$

where $d_{max}$ may be the distance from the origin to the farthest constellation point, based on the modulation scheme used, and $\Delta$ may be the maximum distance between two constellation points.

Figure 3:
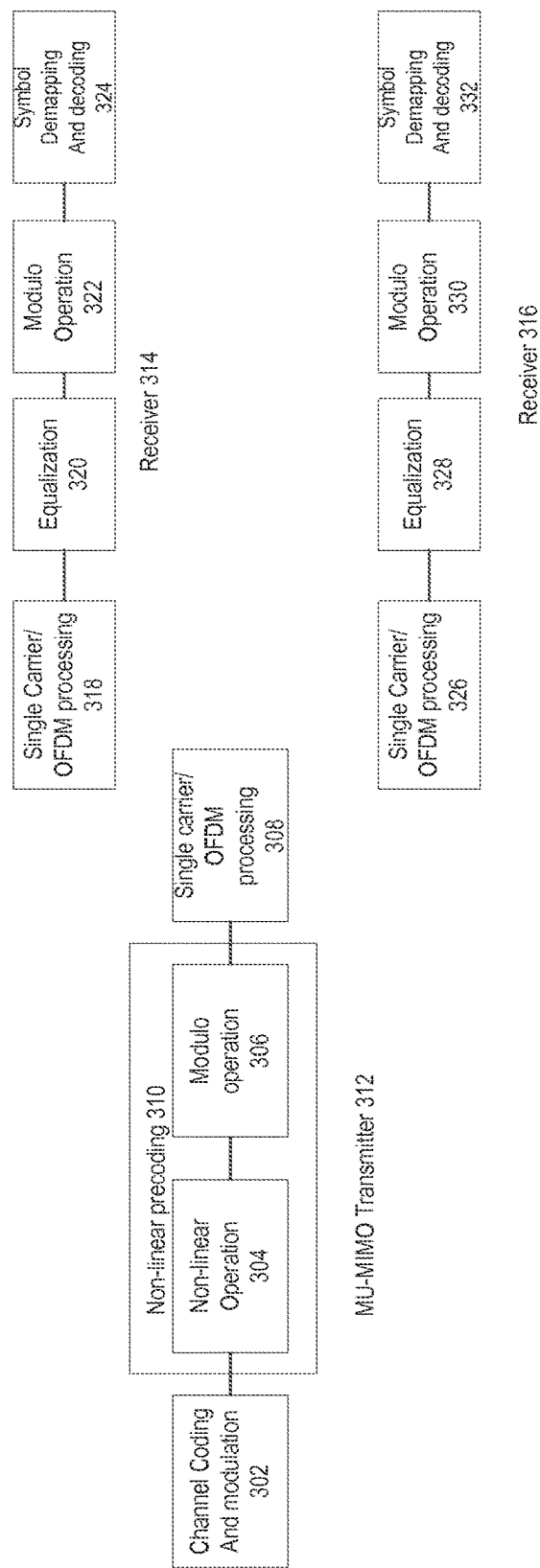
FIG. 3 illustrates an exemplary non-linear MU-MIMO transmitter and receiver.

FIG. 3 illustrates an exemplary non-linear MU-MIMO transmitter and receiver. MU-MIMO Transmitter 312 may include a number of modules that may be used to transmit a signal. For example, MU-MIMO Transmitter 312 may include channel coding and modulation 302, non-linear precoding 310, and/or single carrier/ODFM processing 308.

Non-linear precoding 310 may include non-linear operation 304 and/or modulo operation 306.

Receiver 314 may include a number of modules that may be used to receive a signal. For example, receiver 314 may include single carrier/ODFM processing 318, equalization 320, modulo operation 322, and/or symbol demapping and decoding. Receiver 316 may include a number of modules that may be used to receive a signal. For example, receiver 316 may include single carrier/ODFM processing 318, equalization 320, modulo operation 330, and/or symbol demapping and decoding 332.

A number of non-linear MU-MIMO schemes may be used and may include ordered, or unordered, zero forcing dirty paper coding (ZF-DPC) with Tomlinson-Harashima precoding (THP); ordered or un-ordered minimum mean square error DPC (MMSE-DPC) with THP; vector perturbation using sphere encoding; linear lattice encoder using lentra-lentra-lovasz (LLL) decomposition, or the like.

Ordered, or unordered, Zero Forcing Dirty Paper Coding (ZF-DPC) with Tomlinson-Harashima Precoding (THP) may be used as a non-linear MU-MIMO scheme. In ordered or unordered ZF-DPC with THP, interference may be pre-subtracted at the transmitter for a STA, such that less error precoding errors may be minimized at the STA. For example, interference pre-cancellation may occur. Pre-subtraction may be performed in a zero forcing manner (e.g., by forcing no crosstalk between beamformees). Scalar THP may be performed to ensure that a transmitted signal may satisfy the transmit power requests of a system. The signal for a user may be designed individually and independently of a signal for another user. The pre-subtraction may be ordered to improve performance. The channel may be decomposed into a lower triangular and a matrix using, for example, QR decomposition, LU decomposition, and/or Cholesky decomposition. The inverse of the matrix may be used to linearly pre-multiply the channel. The effective channel may be a triangular matrix, and the input signal may be non-linearly pre-distorted, or pre-subtracted, so that the diagonal elements of the effective channel may be seen by each receiver.

Ordered or un-ordered MMSE-DPC with THP may be used as a non-linear MU-MIMO scheme. Ordered or un-ordered MMSE-DPC with THP may be similar to the ZF-DPC, but pre-subtraction may be done to minimize the mean square error between the transmitted signal and desired signal as opposed to minimizing cross-talk interference.

Vector perturbation may be used as a non-linear MU-MIMO scheme. Vector perturbation using sphere encoding may pre-subtract the interference so that an error may not be seen at a receiver. The signal for a user may be designed with another user. The transmitter may perform a regularized channel inverse and may add an integer vector offset to a transmitted signal. The vector perturbation to the transmitted signal may reduce the transmitted power. A sphere encoder may be used to solve lattice closest problem at transmitter.

Linear lattice encoder using lentra-lentra-lovasz (LLL) decomposition may be used as a non-linear MU-MIMO scheme. Linear lattice encoder using LLL decomposition may be similar to vector perturbation with sphere encoding. LLL decomposition may solve a lattice closest problem by using an LLL algorithm to create a reduced basis with orthogonal columns. A transmitter that may implement linear lattice encoder using LLL decomposition may be less complex than a transmitter that may implement vector perturbation.

QR decomposition based MU-MIMO precoding with THP QR multiuser multiple input multiple output (QR-MU-MIMO) may be disclosed. QR-MU-MIMO may be applied to a WLAN.

NL MU-MIMO may be used to provide performance improvements over linear MU-MIMO in WLAN. To use NL MU-MIMO in a WLAN system, non-linear precoding may be used at an AP. While implementing the NL MU-MIMO, legacy specifications may be retained.

Figure 4:
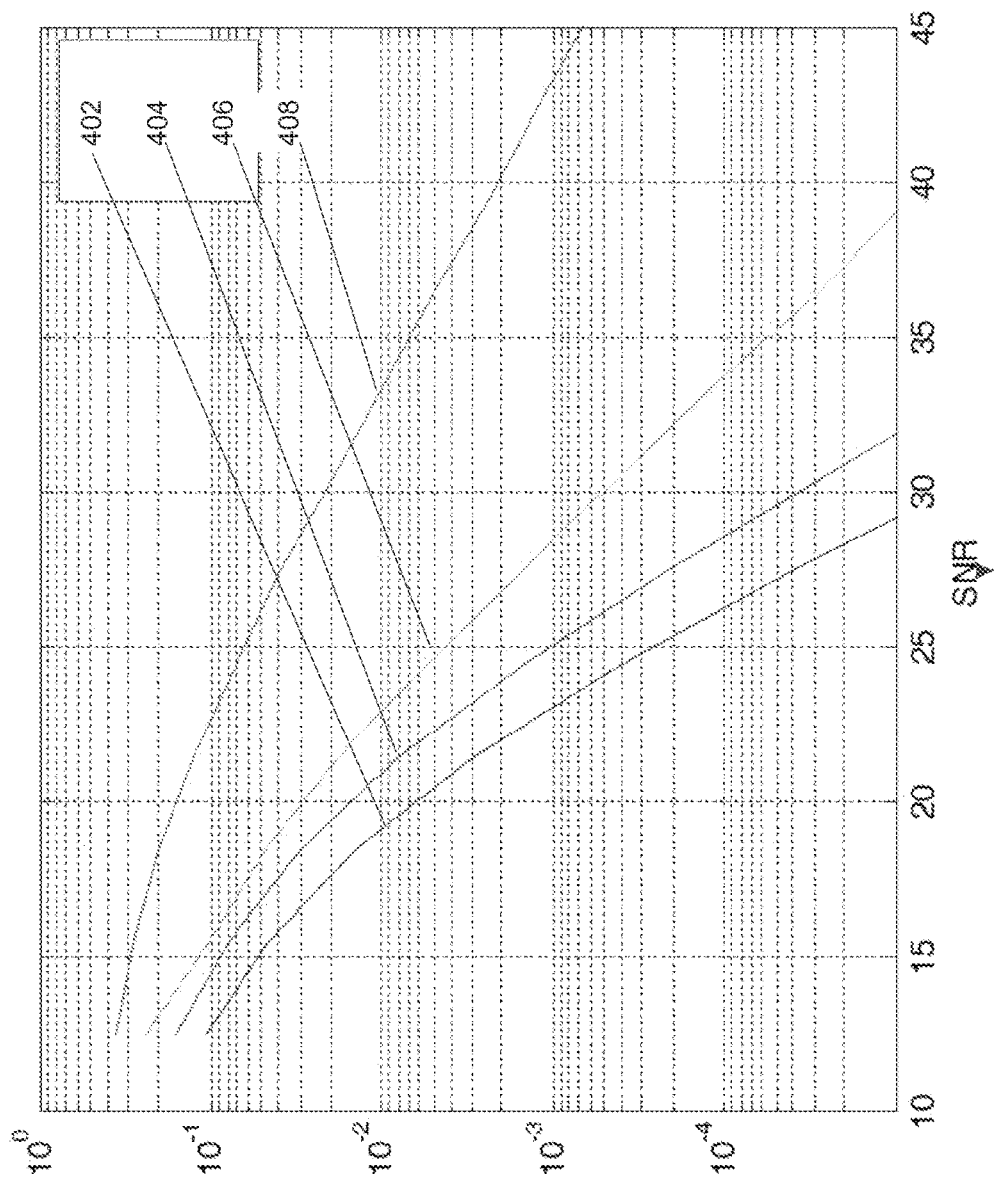
FIG. 4 illustrates an exemplary average per user bit-error rate (BER) performance with no user ordering.

FIG. 4 illustrates an exemplary average per user bit-error rate (BER) performance with no user ordering. When QR NL-MU-MIMO is used, ordering of the user at the transmitter (e.g., AP) side may impact system performance. FIG. 4 may illustrate an average per user BER performance when no particular user ordering may be used. The performance of one or more users may be different. A user with low performance may become a bottleneck for the system performance. In some scenarios, a user performance imbalance may be desirable. In other scenarios, a user performance balance may be preferred. Methods may be used to address user ordering for QR NL-MU-MIMO to address system performance, such as the balance of per-user performance relative to other users.

Figure 5:
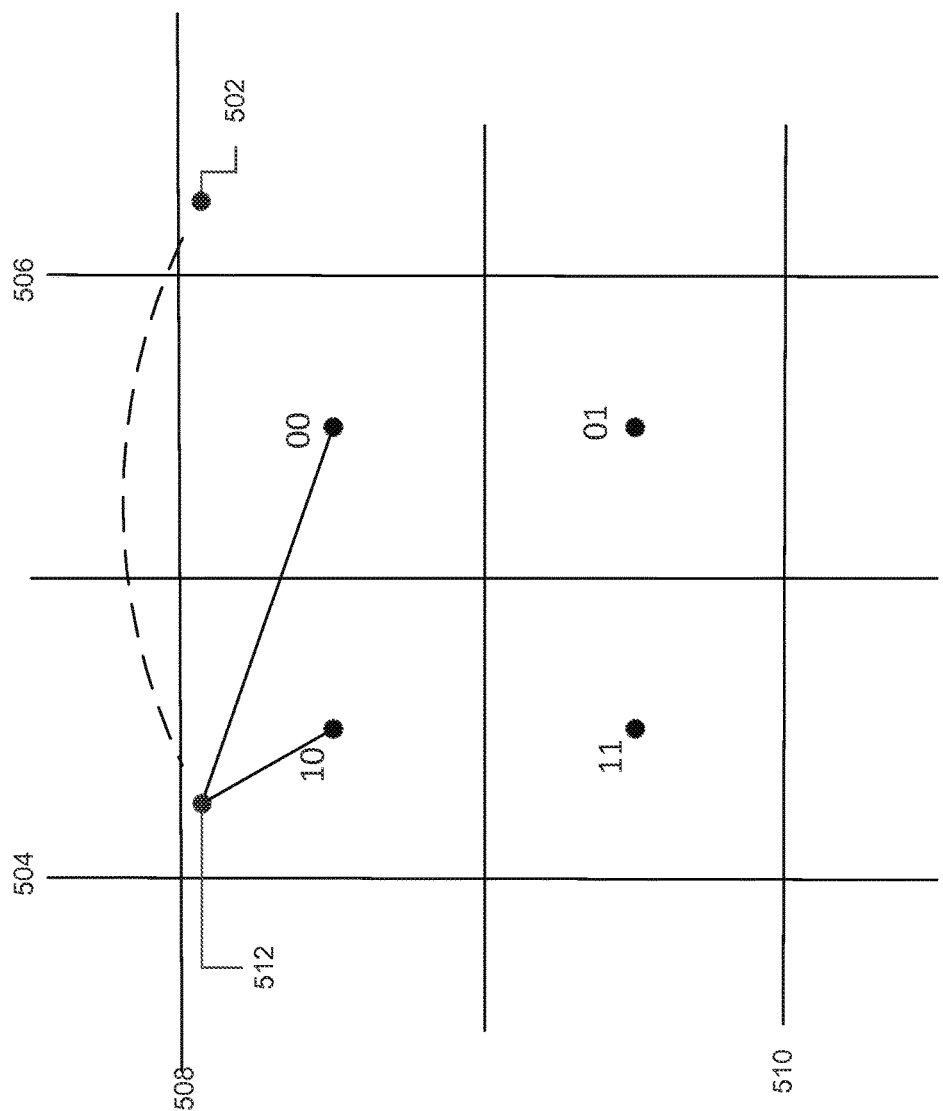
FIG. 5 illustrates an exemplary QPSK constellation.

FIG. 5 illustrates an exemplary QPSK constellation. FIG. 5 illustrates a demapper for QPSK modulation, in which a received signal may fall outside a constellation boundary that may be dictated by a modulo operation. For example, a non-linear operation may result in a transmit signal outside constellation boundaries 504, 506, 508, and/or 510. At 502, a non-linear operation may have resulted in the transmit signal being outside constellation boundary 506 and constellation boundary 508. A modulo operation may result in a transmit signal within constellation boundaries 504, 506, 508, and/or 510. For example, at 512, a modulo operation may result in a transmit signal within constellation boundaries 504, 506, 508, and/or 510.

If no modulo operation occurs, a binary 0 may be detected for the first bit (e.g., the I-branch), and its log likelihood ratio (LLR) may be positive with a large absolute value. If modulo operation does occur, the received signal at 512 may be flipped inside the constellation boundaries, a binary 1 may be detected for the first bit, and its soft LLR may be negative with a large absolute value. The demapper may become ineffective when the modulo operation may be present and an extended demapper may be used.

Figure 6:
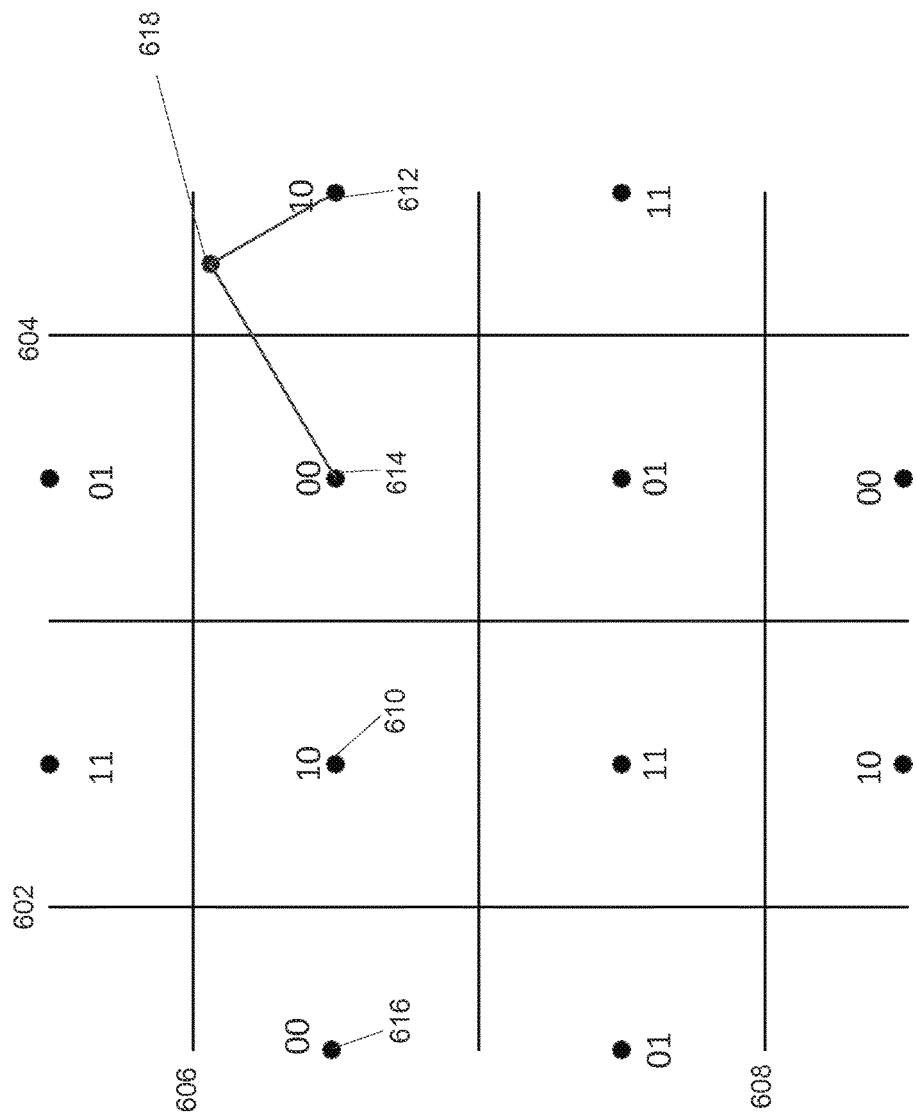
FIG. 6 illustrates an exemplary extended demapper for QPSK constellation.

FIG. 6 illustrates an exemplary extended demapper for QPSK constellation. As shown in FIG. 6, an extended demapper may include a number of constellation boundaries, such as 602, 604, 606, and/or 608. The constellation boundaries may be created by a modulo operation. Constellation points, such as constellation points 610 and 614 may be extended outside the constellation boundaries. Under the modulo operation each of the numbered dot with may translate to the same numbered dot inside the dot and dashed enclosed boundary. For example, constellation point 610, which may have a binary value of 10, may be extended at 612. As another example, constellation point 614, which may have a binary value of 00, may be extended at 616.

When a modulo operation occurs, the received signal at 618 may be compared with an extended constellation point, such as extended constellation point 612. A constellation point may be cloned due to constellation expansion. For example, constellation point 610 may be extended at 612. A binary 1 may be detected, and its soft LLR may be negative. The LLR may have a small absolute value, which may be due to the extended constellation. The extended demapper may be used when a modulo operation may be requested at the receiver side. When a demapper is used, a soft bit LLR may be derived for subsequent processing in a receiver.

Downlink signaling and procedures may be provided. When QR-MU-MIMO QRMU may be used at a transmitter, a user may feed its own channel estimate back to the AP. The AP may collect the channel estimate, may perform QR decomposition, and may perform precoding operations. At the receiver side, a user (e.g., the receiver) may obtain a scalar G to perform proper modulo operation/demapper operation.

For user i, the scalar G_i may depend on user i's channel and may depend on the channel of other users. The scalars may be subcarrier dependent. A scalar G may be signaled to a user that may use the scalar G.

QR decomposition based downlink NL MU-MIMO for application to WLAN (QR-MU-MIMO) may be provided. This may be done, for example, address user ordering, extend demapping, or the like.

Figure 7:
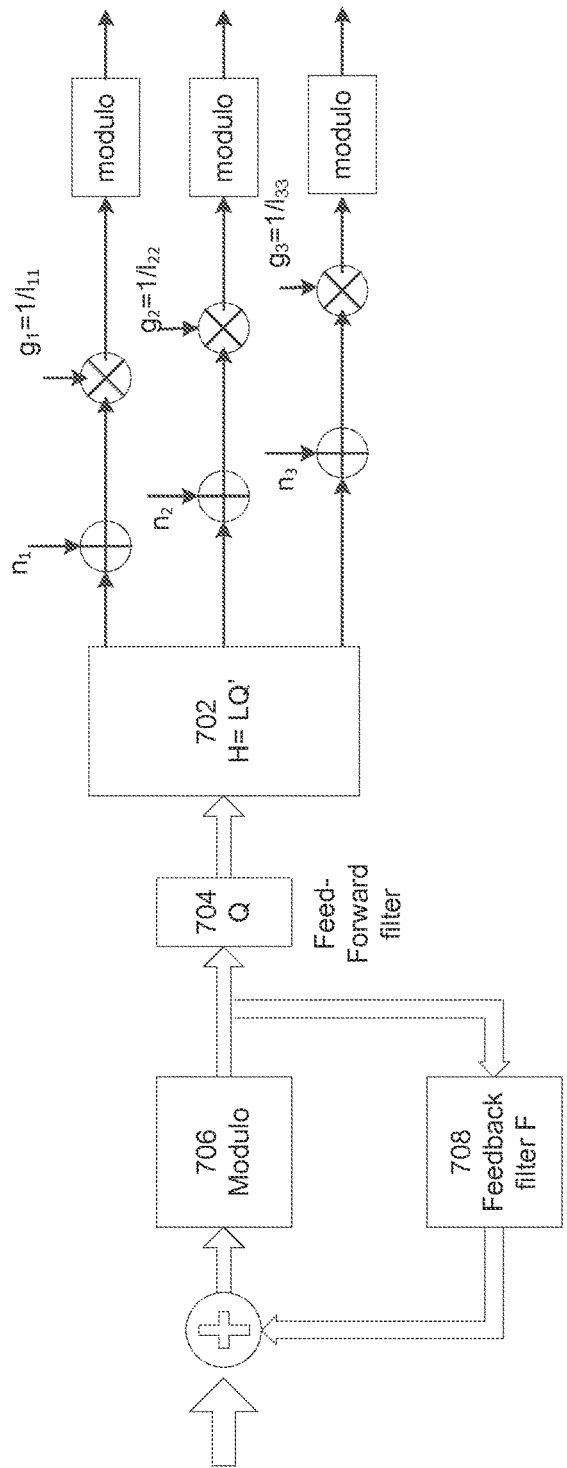
FIG. 7 illustrates an exemplary block diagram of QR based non-linear multi-user multiple input multiple output (NL MU-MIMO).

FIG. 7 illustrates an exemplary block diagram of QR based NL MU-MIMO. A transmitter may include a modulo module at 706, a Q matrix at 704, and/or a feedback filter F at 708. At 702, the MIMO channel between a transmitter and a receiver maybe QR decomposed as:

$$H' = QR \Rightarrow H = R'Q' = LQ'$$

where A' may be the Hermitian of the matrix A and L may be a lower triangular matrix and Q may be a unitary matrix at 704. For a subcarrier, $$y = HX + n = LQ'QX + n = LX + n$$

$$L = \begin{bmatrix} l_{11} & 0 & 0 & 0 \\ l_{12} & l_{22} & 0 & 0 \\ l_{13} & l_{23} & l_{33} & 0 \\ l_{14} & l_{24} & l_{34} & l_{44} \end{bmatrix}$$

where $l_{ij}$ may be the ith column and jth row of the matrix L, where L may be a lower triangular matrix. For a subcarrier, the first user may transmit signals without interference. The subsequent users, to whom the signals may be transmitted to, may pre-subtract the cross-interference from users to whom the signals were transmitted to earlier. The channel seen by a user i may be $l_{ii}$, the crosstalk or interference to the user may be $l_{ij}$. The pre-subtraction process may reduce the effect of the cross-talk at the transmitter, such that the desired signal on the channel may be received by the intended user.

For example, in a two user MU-MIMO system, with the desired information S, the transmitted information X and received signal Y, the matrix L may be given as:

$$L = \begin{bmatrix} l_{11} & 0 \\ l_{12} & l_{22} \end{bmatrix}; \begin{bmatrix} x_1 \\ x_2 \end{bmatrix} = \begin{bmatrix} \lfloor s_1 \rfloor \\ \left\lfloor \frac{-l_{12}}{l_{22}} \hat{s}_1 + s_2 \right\rfloor \end{bmatrix}; Y = \begin{bmatrix} l_{11} s_1 \\ l_{22} s_2 \end{bmatrix}$$

A receiver may operate as if it may be the only receiver in the channel. The relationship between the channel $l_{ii}$, and the cross-talk channels $l_{ij}$ may depend on the orthogonality of the channels to each of the users. The more orthogonal the channels may be, the less cross-talk there may be between the users. For example, if STA i and STA j may be orthogonal, then $l_{ij}=0$. If STA i and STA j may be aligned, $l_{ii}=l_{ij}$ and $l_{ij}=0$. STA i and STA j may be inseparable. A STA selector or scheduler may select users that may be orthogonal (e.g., similar to the selection criterion for the linear zero forcing receiver).

Figure 8:
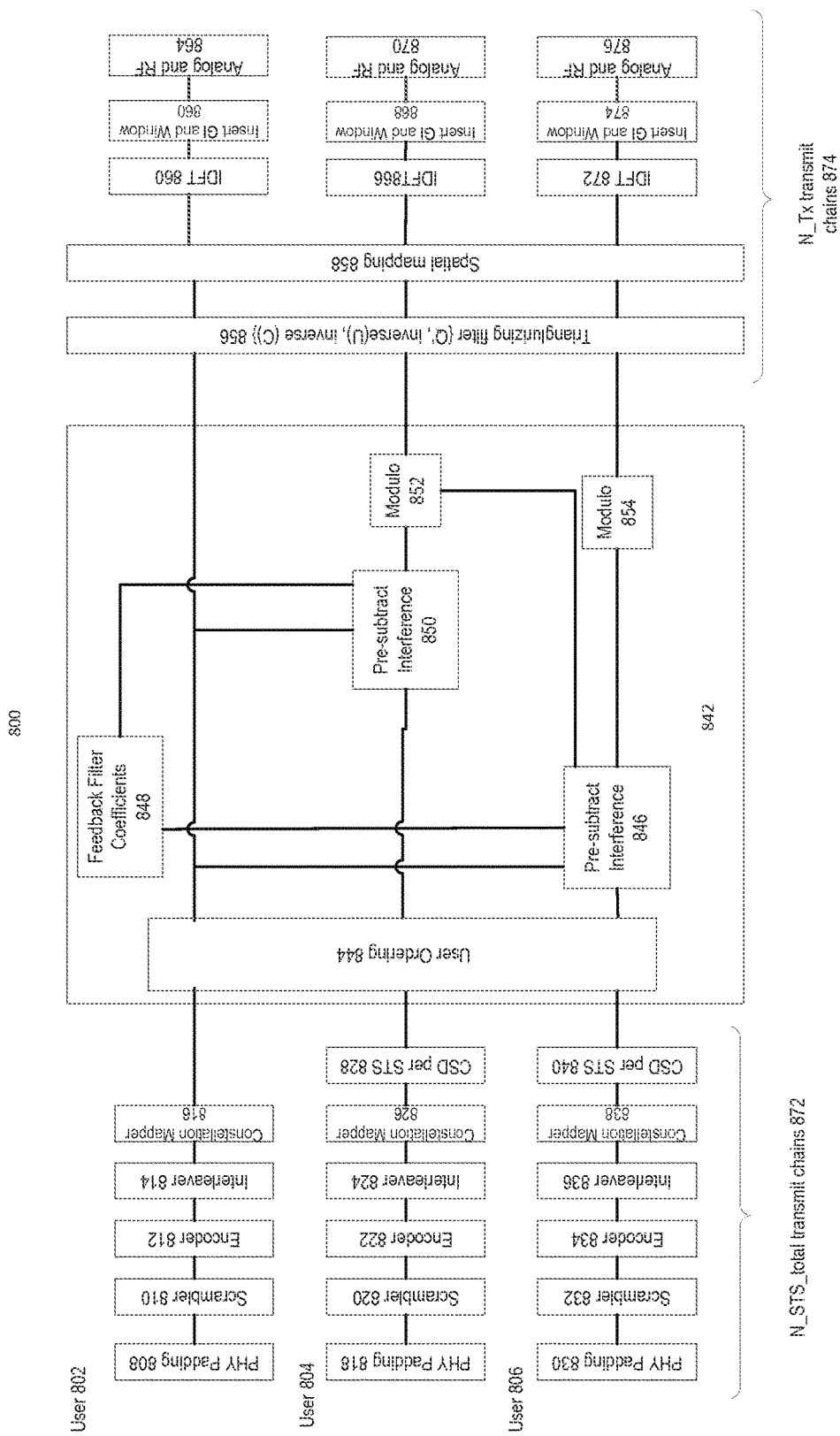
FIG. 8 illustrates an exemplary transmitter block diagram for a data field of a NL-MU-MIMO procedure protocol data unit (PPDU).

FIG. 8 illustrates an exemplary transmitter block diagram for transmitting a data field of a NL-MU-MIMO procedure protocol data unit (PPDU). Transmitter block 800 may include N_STS_total transmit chains 872, transmitted associated functions 842, and N_Tx_transmit chains 874.

N_STS_total transmit chains 872 may include a transmit chain for a user, such as user 802, user 804, and user 806. A transmit chain for user 802 may include PHY padding 808, scrambler 810, encoder 812, interleaver 814, and/or constellation mapper 816. A transmit chain for user 804 may include PHY padding 818, scrambler 820, encoder 822, interleaver 824, constellation mapper 826, and/or Cyclic Shift Diversity (CSD (cyclic shift delay)) per STS 828. A transmit chain for user 806 may include PHY padding 830, scrambler 832, encoder 834, interleaver 836, constellation mapper 838, and/or CSD per STS 840.

Interference cancellation block 842 may include a number of modules that may be used for NL-MU-MIMO. For example, 842 may include user ordering 844, feedback filter coefficients 848, pre-subtract interference 846, pre-subtract interference 850, modulo 852, and/or modulo 854.

N_Tx_transmit chains 874 may include a transmit chain for a user, such as user 802, user 804, and user 806. A transmit chain may include triangularizing filter 856, which may be a Q' filter, an inverse(U) filter, an inverse (C) filter, or the like. A transmit chain may include spatial mapping 858. A transmit chain may include an IDFT module, such as 872, 874, and 876; an insert GI and window module, such as 874, 868, and 860; and an analog and RF module, such as 876, 870, and 864.

Figure 9:
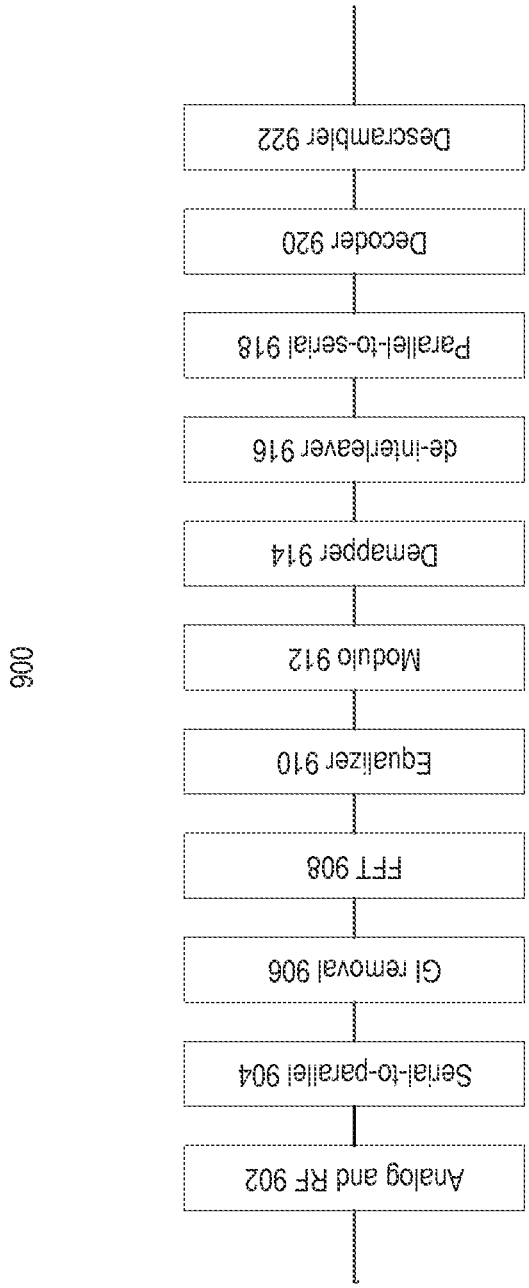
FIG. 9 illustrates an exemplary receiver block for data field of a NL-MU-MIMO PPDU.

FIG. 9 illustrates an exemplary receiver block for transmitting a data field of a NL-MU-MIMO PPDU. Receiver 900 may include a number of modules that may be used for NL-MU-MIMO. For example, receiver 900 may include analog and RF 902, serial-to-parallel 904, GI removal 906, FFT 908, equalizer 910, modulo 912, demapper 914, de-interleaver 916, parallel-to-serial 918, decoder 920, descrambler 922, and the like.

Figure 10:
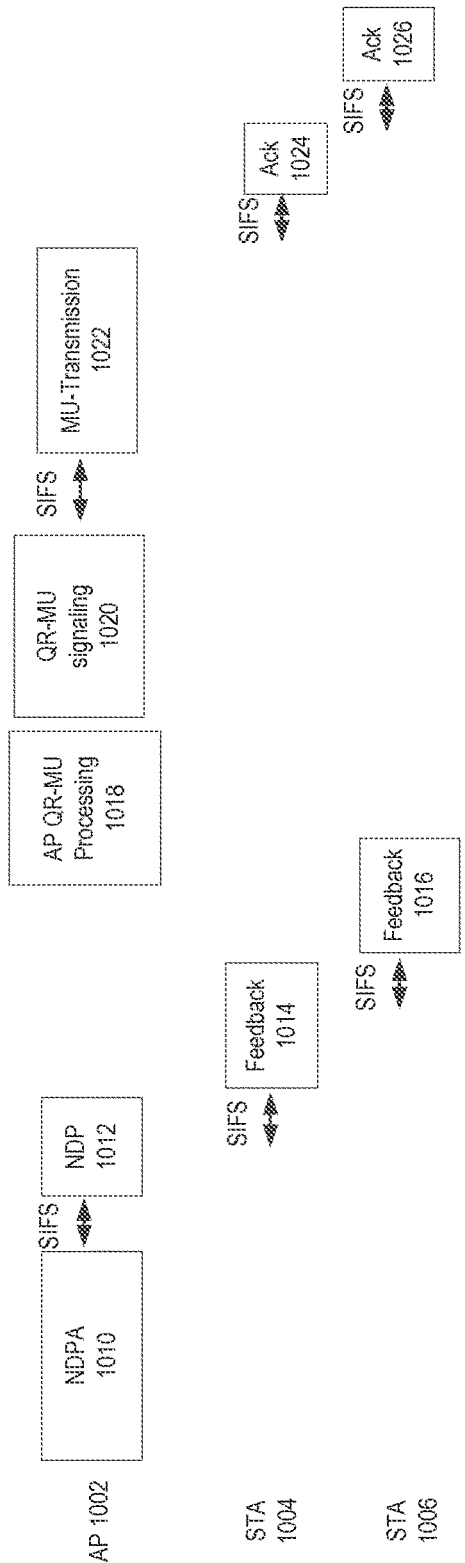
FIG. 10 illustrates an exemplary NL-MU-MIMO in a wireless local area network (WLAN).

NL-MU-MIMO may be used in WLAN systems. FIG. 10 illustrates an exemplary NL-MU-MIMO in a wireless local area network (WLAN). As shown in FIG. 10. AP 1002 may send out a null data packet announcement (NDPA) to announce the sending of an NDP packet to arrive at 1010. The AP may send out the NDP to enable accurate channel estimation at a receiver.

STA 1004 may estimate its channel and may send back channel feedback at feedback 1014. STA 1006 may estimate its channel and may send back channel feedback at 1016.

AP 1002 may collect channel estimates from one or more users and may perform QR-based signal processing at 1018. For example, AP 1002 may receive feedback from STA 1004 and/or feedback from STA 1006. AP 1002 may compute the feed-forward filter Q, the feedback filter F, and/or the diagonal loadings G.

At 1020, AP 1002 may signal the QR information to a STA. For example, AP 1002 may signal diagonal loading values and a modulo choice, which may be MCS dependent. This information may include, for example, codepoints, which may be included in the SIG field; information transmitted in a side channel such as a primary channel; information that may be in a pilot signal; and the like.

At 1022, AP 1002 may send a MU-transmission. AP 1002 may use the feed-forward filter Q and feedback filter F to filter the multi-user data streams.

A receiver (e.g., a STA) may apply the diagonal loading and modulo based on AP signaling. The receiver may separate demapping/decoding. Extended de-mapper may be used to account for the effect of modulo operation. A STA may send a separate ACK to the AP to acknowledge successful receipt of the transmission. For example, at 1024 STA 1004 may send an ACK to AP 1002 and at 1026 STA 1006 may send an ACK to AP 1002. QR-MU-MIMO may rely on implicit feedback, where a NDP or feedback packet may not be requested.

User ordering for NL-MU-MIMO may be provided and a number of user ordering strategies may be utilized. User ordering for NL-MU-MIMO may be applied to systems having any number of transmit antennas, any number of receivers, or any combination thereof. For example, the methods for user ordering described herein may be applied to a system that may have a different number of antennas per receiver.

For QRMU modulation, the transmitter (e.g., the AP) may group multiple receivers (e.g., the STAs) for joint downlink transmissions. For example, an AP may have four transmit antennas and four receiver. A receivers may have a receive antenna, e.g the four receives may each have one receive antenna. For example, h1 may be the channel vector for receiver 1, h2 may be the channel vector for receiver 2, h3 may be the channel vector for receiver 3, and h4 may be the channel vector for receiver 4. A channel vector may be a row vector, e.g., of size 1×4.

The AP may receive channel feedback of h1 from receiver 1, h2 from receiver 2, h3 from receiver 3, and/or h4 from receiver 4. The AP may have flexibility in grouping multiple users and in selecting the order in which the users may be processed within the group.

The AP may order the user as (user 1, user 2, user 3, and user 4) such that the AP may form the channel matrix $$H_1 = \begin{bmatrix} h1 \\ h2 \\ h3 \\ h4 \end{bmatrix}$$

for processing. H1 may be a 4×4 matrix. QR decomposition of this channel matrix may be given by: $Q_1 R_1 = H_1'$, where Q1 may be a unitary 4×4 matrix, and $$R1 = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix}$$

may be a upper-triangular with real diagonal values and complex off-diagonal values. Pre-cancellation of other user signals based on R1 may be carried out and may be followed by unitary precoding of the pre-cancelled signals based on Q1. For such a user ordering, the error rate performance for a user may be illustrated in FIG. 11.

Figure 11:
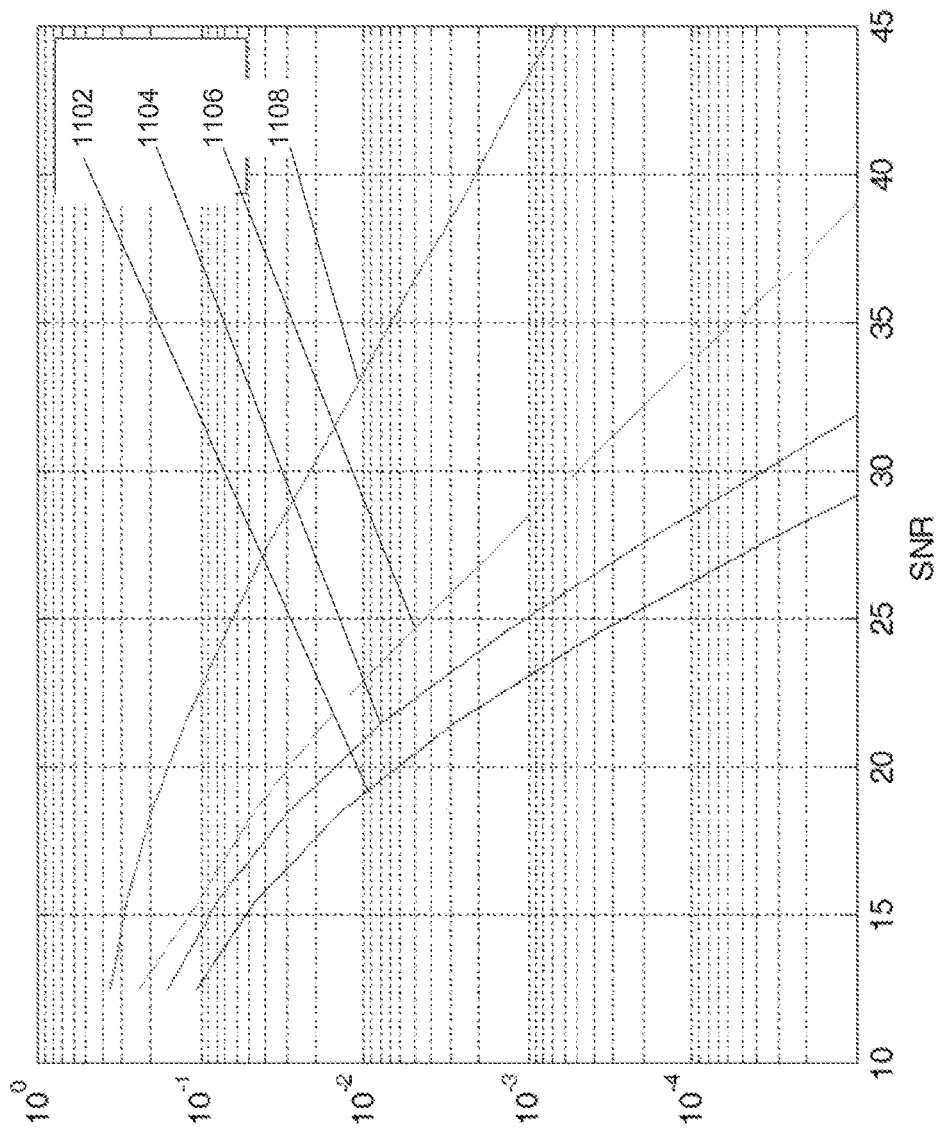
FIG. 11 illustrates an exemplary average per user BER performance with fixed user ordering.

FIG. 11 illustrates an exemplary average per user BER performance with fixed user ordering. In FIG. 11, line 1102 may be for user 1, 1104 may be for user 2, 1106 may be for user 3, and 1108 may be for user 4. As shown at 1102, user 1 may be a first place and may get better performance than other users, while at 1108 user 4 may be in a last place may have lower performance. The worst user (e.g., user 4 here) may become a performance bottleneck.

The AP may order the user in an arbitrary way (e.g. user 3, user 2, user 1, and user 4) such that AP may form the channel matrix $$H_2 = \begin{bmatrix} h3 \\ h2 \\ h1 \\ h4 \end{bmatrix}$$

for further processing. The matrix H2 may be a 4×4 matrix. QR decomposition of this channel matrix may be given by: $Q_2 R_2 = H_2'$, where Q2 is a unitary 4×4 matrix, and $$R2 = \begin{bmatrix} t_{11} & t_{12} & t_{13} & t_{14} \\ 0 & t_{22} & t_{23} & t_{24} \\ 0 & 0 & t_{33} & t_{34} \\ 0 & 0 & 0 & t_{44} \end{bmatrix}$$

may be upper-triangular with real diagonal values and complex off-diagonal values. Pre-cancellation of other user signals based on R2 may be carried out, followed by unitary precoding of the pre-cancelled signals based on Q2.

Each user's performance may depend (e.g., solely) on the diagonal entries. If the ordering of user 1, user 2, user 3, user 4 may be used, user 1's performance may depend on the diagonal entry of $r_{11}$, user 2's performance may depend on the diagonal entry of $r_{22}$, user 3's performance may depend on the diagonal entry of $r_{33}$, and user 4's performance may depend on the diagonal entry of $r_{44}$. Due to channel estimation error and/or quantization errors, the performance of each user may depend on other factors.

If the ordering of user 3, user 2, user 1, user 4 may be used, user 3's performance may depend on the diagonal entry of $t_{11}$, user 2's performance may depend on the diagonal entry of $t_{22}$, user 1's performance may depend on the diagonal entry of $t_{11}$, and user 4's performance may depend on the diagonal entry of $t_{44}$.

The four users may experience different error rate performance. The AP may find an ordering such that the minimum-SNR-user's performance is maximized or the maximum-SNR-user's performance is minimized, which may have the same purpose of having balanced performance across multiple users. For example, $$H = \begin{bmatrix} h1 \\ h2 \\ h3 \\ h4 \end{bmatrix}$$

where H may be an arbitrary ordering of the channel vectors. To determine an ordering of channel vector number a channel correlation matrix may be computed as: $A = H*H'$. An matrix inverse inv(A) may be calculated. A may be a Hermitian matrix and with probability 1, and A may be invertible. Diagonal entries of inv(A) may be sorted in (e.g., a descending order). The ordering output of inv(A) may be used to sort users for final QRMU operation. For example, in Matlab mathematics, this may be expressed as:

sort(diag(inv($H*H'$)),'descend')

One matrix inverse may be needed to find the max-min ordering. A numerical performance evaluation may show that the max-min-SNR ordering may be close to an optimal ordering. The QRMU with max-min-SNR ordering may outperform the QRMU scheme with no ordering.

Min-row-norm ordering may be provided. For min-row-norm ordering, ordering by sorting the users based on their row norms may be used as a proxy for sorting the users based on their effective channels after QR decomposition. This may approximate optimal ordering. Sorting based on the diagonal R elements may require a search, a determination of possible orders, or an iterative operation. The norm of the rows of the effective channel created by aggregating the channels to a user may be computed and sorted in an ascending order. This may, for example, provide a low complexity ordering of the channel vectors.

FIG. 12(a) illustrates an aggregated channel from an AP to four STAs. FIG. 12(b) illustrates the effective channels with no ordering. The effective channels may be the channels at 1202, 1204, 1206, and 1208. FIG. 12(c) illustrates the effective channels with min-norm ordering. The effective channels may be the channels at 1210, 1212, 1214, and 1216. FIG. 12(d) illustrates the effective channels with max-norm ordering. The effective channels may be the channels at 1218, 1220, 1222, and 1224.

As shown in FIGS. 12(a)-12(d), with min-norm ordering, the effective channel of a user that may be experiencing decreased performance (e.g., minimal of the absolute values of the diagonal entries) may be improved with min-row-norm ordering. The effective channel of that user may worsen with max-row-norm ordering. The min-row-norm ordering may achieve performance that may be better than no ordering, but not be as good as max-min-SNR ordering.

Figure 13:
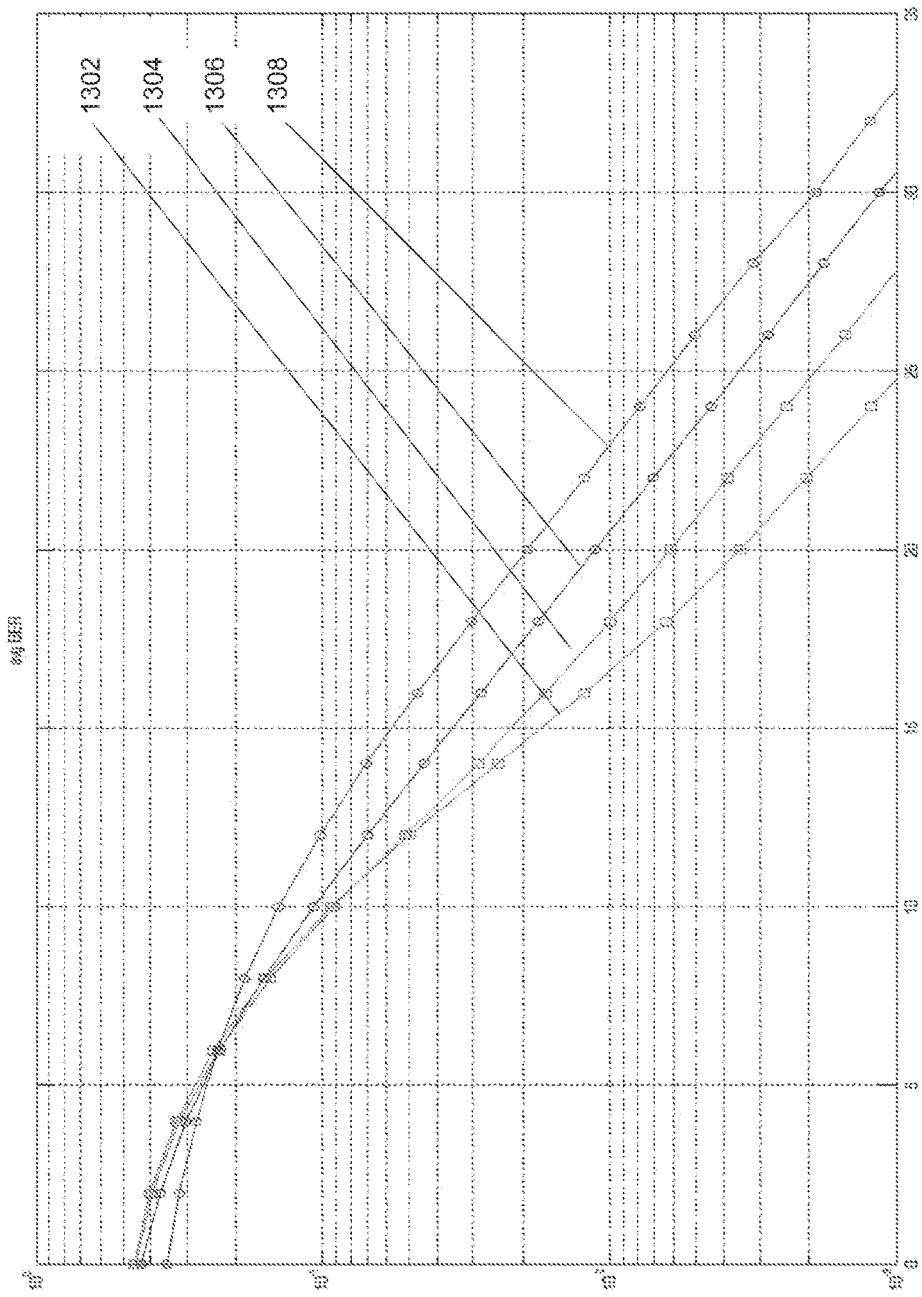
FIG. 13 illustrates an exemplary performance of various schemes.

FIG. 13 illustrates an exemplary performance various schemes. 1302 may use a NLP MU-MIMO with max-min SNR ordering. 1304 may use a NLP MU-MIMO with min-row-norm ordering. 1306 may use a NLP MU-MIMO without ordering. 1308 may use a zero forcing (ZF) precoding scheme.

To perform the min-row-norm ordering, the norms of the individual rows of an effective channel H may be calculated. For example, given an effective channel $$H = \begin{bmatrix} h1 \\ h2 \\ h3 \\ h4 \end{bmatrix}$$

the norms of the individual rows of H, $|h1|, \ldots, |hn|$ may be computed. The row norm values of H may be sorted in an ascending order. The rows of the channel may be re-ordered to form a new effective channel based on the row order. For example, if the sorted order is 2, 3, 1, and 4 effective channels may be given as:

$$H\_new = \begin{bmatrix} h2 \\ h3 \\ h1 \\ h4 \end{bmatrix}$$

Non-linear QR precoding may be performed on the new effective channel. The ordering output from the non-linear QR precoding may be used to sort users in a QRMU operation.

Ordering based on a received SNR for a ZF precoding may be provided. A user ordering for a non-linear precoding may be based on channels at a receiver. The received SNR using a zero forcing (ZF) precoder may be an indicator of how the users may be ordered for non-linear precoding. A channel pseudo-inverse may be computed by: $Q = H^H(HH^H)^{-1}$. Each column of Q may be normalized to form QN. QN may be the ZF precoder normalized such that each user may transmit the same power. The received power vector may be: $P = |diag(H^*QN)|$. The entries of P may be sorted in ascending order. This may be the order in which the channel matrix may be ordered prior to QR decomposition.

Ordering across multiple frequency tones may be provided. For example, a number of ordering strategies may be used for a subcarrier or a flat fading channel. As another example, ordering strategies for multi-carrier modulation and its variants may be provided.

Figure 14:
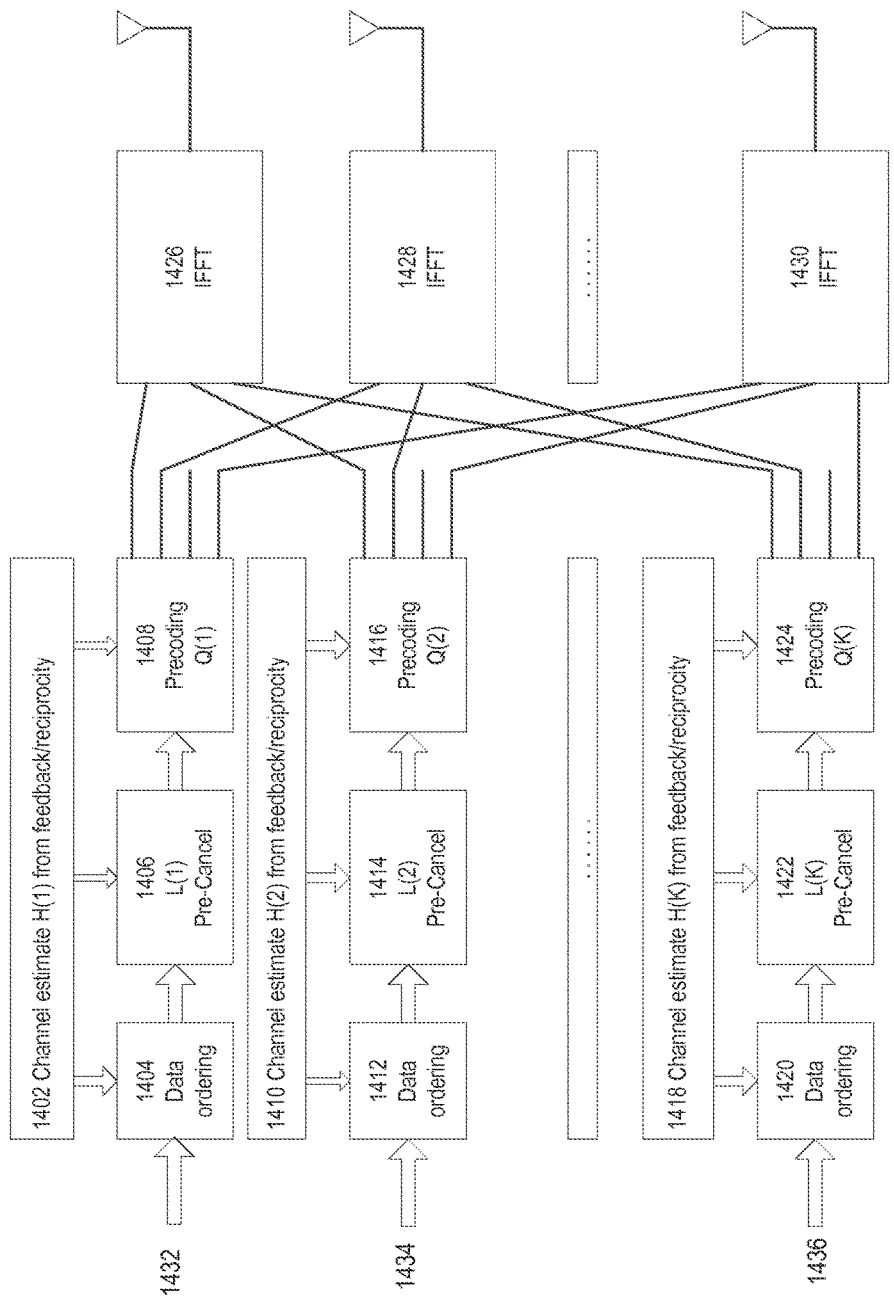
FIG. 14 illustrates an exemplary independent user ordering for QR multi-user multiple input multiple output (QR-MU-MIMO).

FIG. 14 illustrates an exemplary independent user ordering for QR-MU-MIMO, which may be used in an OFDM system. When QRMU may be applied in a multi-carrier communication system, such as an OFDM system, a determination may be made as to whether user ordering may be performed. It may also be determined when user ordering may be performed. As different users may experience different channels in a frequency domain, the optimal ordering for a subcarrier may be different. And uniform ordering may not provide a performance benefit for one or more users.

As shown in FIG. 14, independent user ordering may be used to enable QRMU across multiple orthogonal subcarriers, such as subcarrier 1432, 1434, and 1436. For example, for each subcarrier k, the AP may perform one or more of the following. The AP may find a good ordering for a subcarrier k. For example, the AP may determine a data ordering at 1404, 1412, and/or 1420. To find an ordering, the AP may stack multiple row channel vectors from multiple users in an arbitrary order to obtain an initial channel matrix H(k). For example, the AP may obtain an channel estimate H(k) at 1402, 1410, and/or 1418. The AP may compute $A(k) = H(k)^*H(k)'$. The AP may find an matrix inverse inv (A(k)). The AP may sort the diagonal entries of inv(A(k)), e.g., in a descending order. The AP may reorder data symbols that may be transmitted on subcarrier k. The data symbols may be reordered using the ordering indices given by inv(A(k)), e.g., in a descending order. The AP may obtain a reordered channel matrix Hr(k) by recording rows of the channel matrix H(k). The AP may compute a QR decomposition of Hr(k), and may obtain Q(k) and/or R(k). The AP may perform pre-cancellation of other user signals based on the upper-triangular matrix R(k). The AP may perform unitary precoding of other user signals based on an unitary precoding matrix Q(k). For example, the AP may perform precoding at 1408, 1416, and/or 1424. The AP may perform inverse FFT (IFFT) operation on precoded signals that may be sent on a transmit antenna. For example, the AP may perform an IFFT operation at 1426, 1428, and/or 1430. The inverse FFT output may be upconverted, filtered, and/or sent from a transmit antenna. Similar user ordering may be carried out for other variants of multi-carrier modulations.

Figure 15:
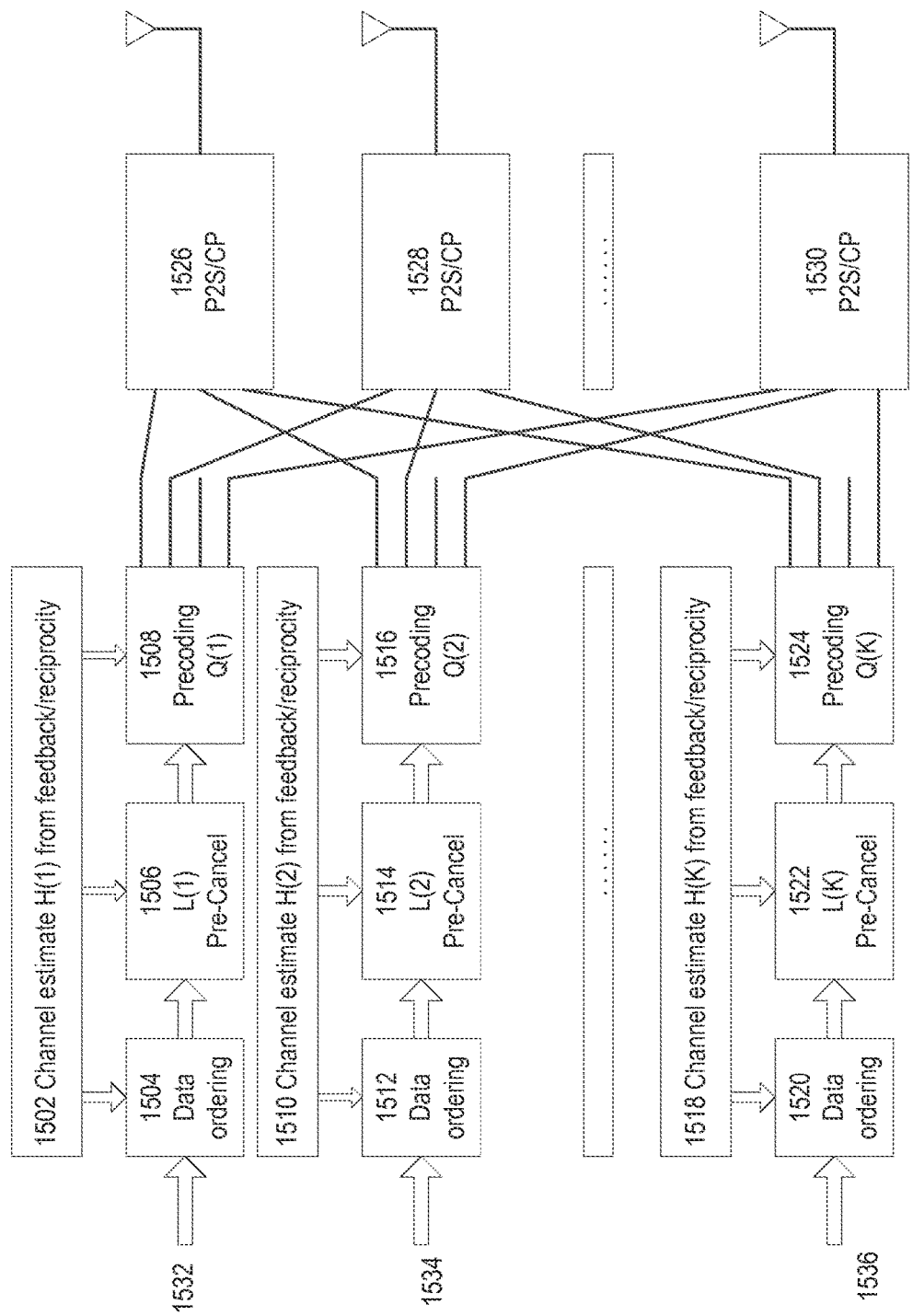
FIG. 15 illustrates an exemplary independent user ordering for QR-MU-MIMO in SC-FDE systems.

FIG. 15 illustrates an exemplary independent user ordering for QR-MU-MIMO in a single-carrier with frequency domain equalization (SC-FDE), where parallel to serial conversion with cyclic prefix insertion (P2S/CP) may be used. As shown in FIG. 15, independent user ordering may be used to enable QRMU across multiple orthogonal subcarriers, such as subcarrier 1532, 1534, and 1536. For example, for each subcarrier k, the AP may perform one or more of the following. The AP may find a good ordering for a subcarrier k. For example, the AP may determine a data ordering at 1504, 1512, and/or 1520. To find an ordering, the AP may stack multiple row channel vectors from multiple users in an arbitrary order to obtain an initial channel matrix H(k). For example, the AP may obtain an channel estimate H(k) at 1502, 1510, and/or 1518. The AP may compute A(k)=H(k)*H(k)'. The AP may find an matrix inverse inv (A(k)). The AP may sort the diagonal entries of inv(A(k)), e.g., in a descending order. The AP may reorder data symbols that may be transmitted on subcarrier k. The data symbols may be reordered using the ordering indices given by inv(A(k)), e.g., in a descending order. The AP may obtain a reordered channel matrix Hr(k) by recording rows of the channel matrix H(k). The AP may compute a QR decomposition of Hr(k), and may obtain Q(k) and/or R(k). The AP may perform pre-cancellation of other user signals based on the upper-triangular matrix R(k). The AP may perform unitary precoding of other user signals based on an unitary precoding matrix Q(k). For example, the AP may perform precoding at 1508, 1516, and/or 1524. The AP may perform a P2S/CP operation on precoded signals that may be sent on a transmit antenna. For example, the AP may perform a P2S/CP operation at 1526, 1528, and/or 1530. The P2S/CP operation output may be upconverted, filtered, and/or sent from a transmit antenna.

Uniform user ordering may be provided. Independent ordering may be used to improve the performance of a user. In some cases, the AP may not improve the performance of each of the users. The ordering strategy may consider MAC layer requirements, such as the quality of service (QoS) requirements, (e.g., delay, latency requirements), the packet size requirements, fairness requirements, and the like. The AP may enhance the performance of a user or a group of users. For example, one user may have more data to transmit and the AP may choose to provide this user with better performance. The AP may the user as a first user as the performance of first user may be better than the rest of users. Uniform ordering may be based on a criterion that may be averaged over the entire frequency band, e.g., users may have the same ordering for the sub-carriers.

To provide a uniform ordering one or more of the following may be performed. For each sub-carrier k, an AP may calculate a metric according to pre-selected criterion. For example, the AP may compute A(k)=H(k)*H(k)', find the matrix inverse inv(A(k)), and define the per sub-carrier metric as C(k)=diag(inv(A(k))). The AP may compute A(k)=H(k)*H(k)', and define the per sub-carrier metric as C(k)=diag(A(k)). The AP may average the metric over each of the sub-carriers such that C=mean(C(k)). The AP may sort C in a descending or ascending order depending on the definition of the per sub-carrier metric C(k). The AP may order user using the sorting index obtained while sorting C.

Extended demapping may be provided for 16QAM and/or 64 QAM. When extended demapper may be used for 16QAM and 64QAM, a soft bit LLR may be calculated for a received symbol. This may be done, for example, by counting the probability of receiving the received symbol given the constellation points in a constellation. The computation complexity may increase with the number of bits (e.g., 4 bit for 16QAM and 6 bit for 64QAM). The complexity may increase for a demapper, and for an extended demapper. For an extended demapper, a constellation point may be more than a clone due to the constellation extension. The max-log-MAP approximation may be utilized in calculating the soft bit LLRs, for example, when extended demapper may be used for 16QAM and 64QAM. The max-log-MAP may be used to reduce demapping complexity.

Figure 16:
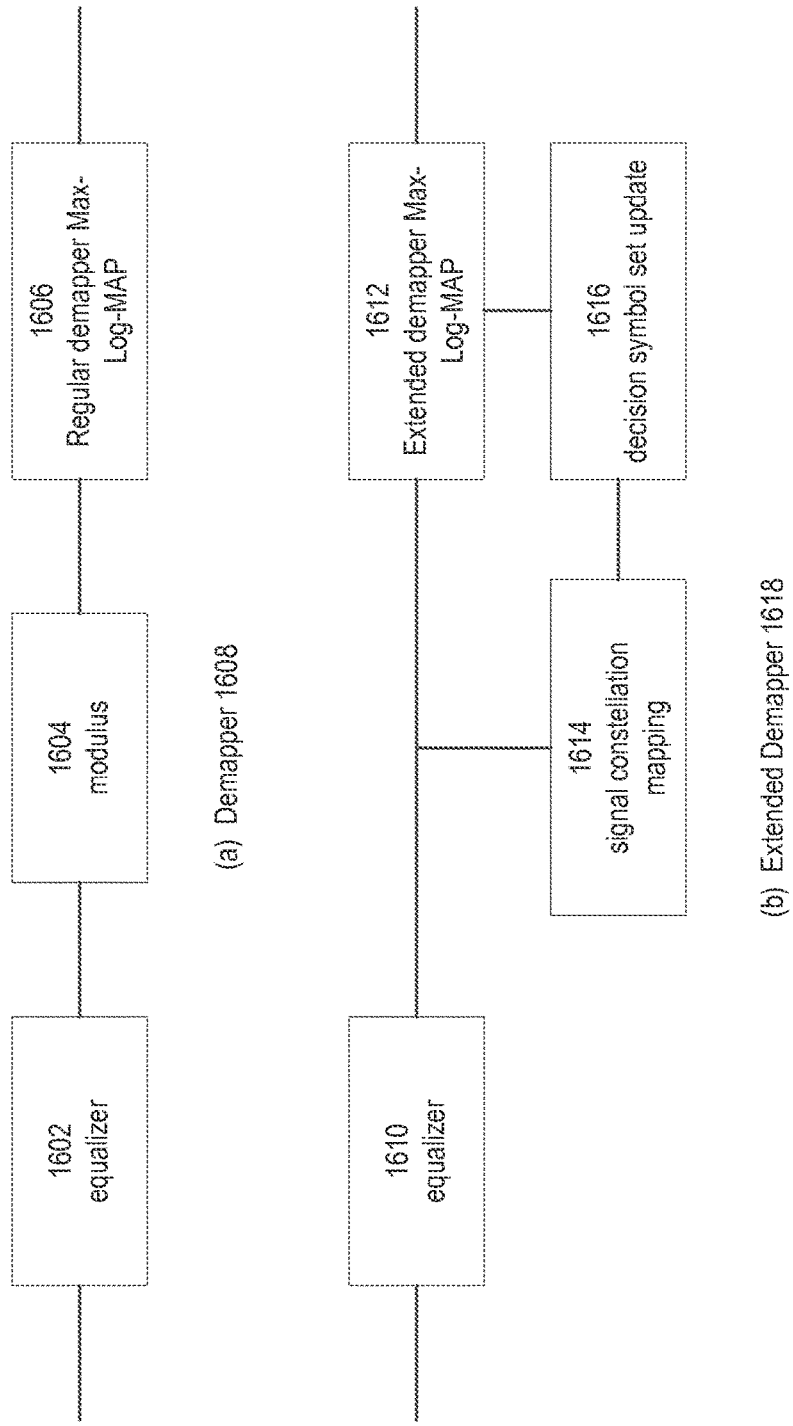
FIG. 16 illustrates an exemplary of max-log-MAP extended demapping.

FIG. 16 illustrates exemplary max-log-MAP extended demapping. As shown in FIG. 16, demapper 1608 may include a number of modules such as equalizer 1602, modulus 1604, and regular demapper max-log-MAP 1606. Extended demapper 1618 may include a number of modules such as equalizer 1610, extended demapper max-log-MP 1612, signal constellation mapping 1614, and decision symbol set update 1616.

Figure 17:
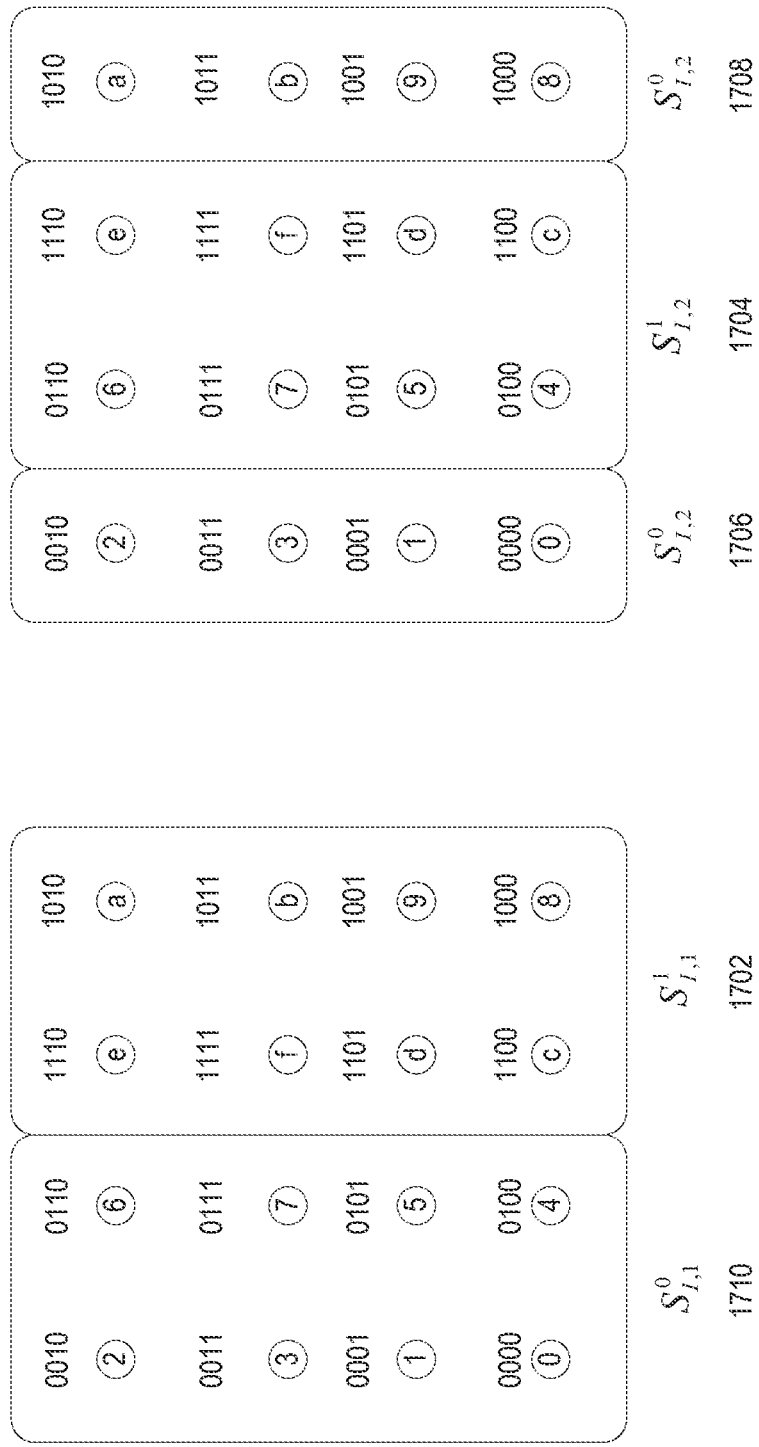
FIG. 17 illustrates an exemplary decision symbol sets for the regular signal constellation.

FIG. 17 illustrates an exemplary decision symbol sets for the regular signal constellation. In case of extended demapping for 16QAM modulations, the soft bit decisions may be given by:

$$LLR(b_{I,k}) = \log \frac{\sum_{\alpha \in S_{I,k}^1} p(r[i] \mid a[i] = \alpha)}{\sum_{\alpha \in S_{I,k}^0} p(r[i] \mid a[i] = \alpha)}$$

where $b_{I,k}$ may represent the kth bit in I-branch, r[i] may represent the received signal at i, a[i] may represent the transmitted QAM symbol at $S_{I,k}^1$ such as at 1702 and 1704 may be a set of transmitted symbols that may have a 1 in the kth bit of I-branch, while $S_{I,k}^0$ such as at 1706, 1708, and 1710 may be a set of symbols that have a 0 in the kth bit of 1-branch. The same may apply to bit $b_{Q,k}$, which may be the kth bit in Q-branch.

The max-log-MAP approximation may be used, leading to $$LLR(b_{I,k}) \approx \log \frac{\max_{\alpha \in S_{I,k}^1} p(r[i] \mid a[i] = \alpha)}{\max_{\alpha \in S_{I,k}^0} p(r[i] \mid a[i] = \alpha)}$$

With y[i] being the equalized signal (e.g., zero-forcing equalization), the soft bits may be given by:

$$LLR(b_{I,k}) = \frac{|G_{ch}(i)|^2}{4} \left\{ \min_{\alpha \in S_{I,k}^0} |y[i] - \alpha|^2 - \min_{\alpha \in S_{I,k}^1} |y[i] - \alpha|^2 \right\}$$

The performance metric DJ.k may be:

$$D_{I,k} = \min_{\alpha \in S_{I,k}^0} |y[i] - \alpha|^2 - \min_{\alpha \in S_{I,k}^1} |y[i] - \alpha|^2$$

the soft bit decision task may be performed by evaluating $\{D_{I,k}\}$ for various bit index k on I/Q branch. The symbol sets $S_{I,k}^0$ and $S_{I,k}^1$ may dictate the end result of $\{D_{I,k}\}$.

For 16QAM constellations, for example, the symbol sets and the performance metrics $\{D_{I,k}\}$ may be fixed. For extended demapper, the signal constellation may move with the received signal. For example, the decision symbol sets $\{S_{I,k}^0, S_{I,k}^1\}$ may move with the received signal. The performance metric may be modified accordingly.

Figure 18:
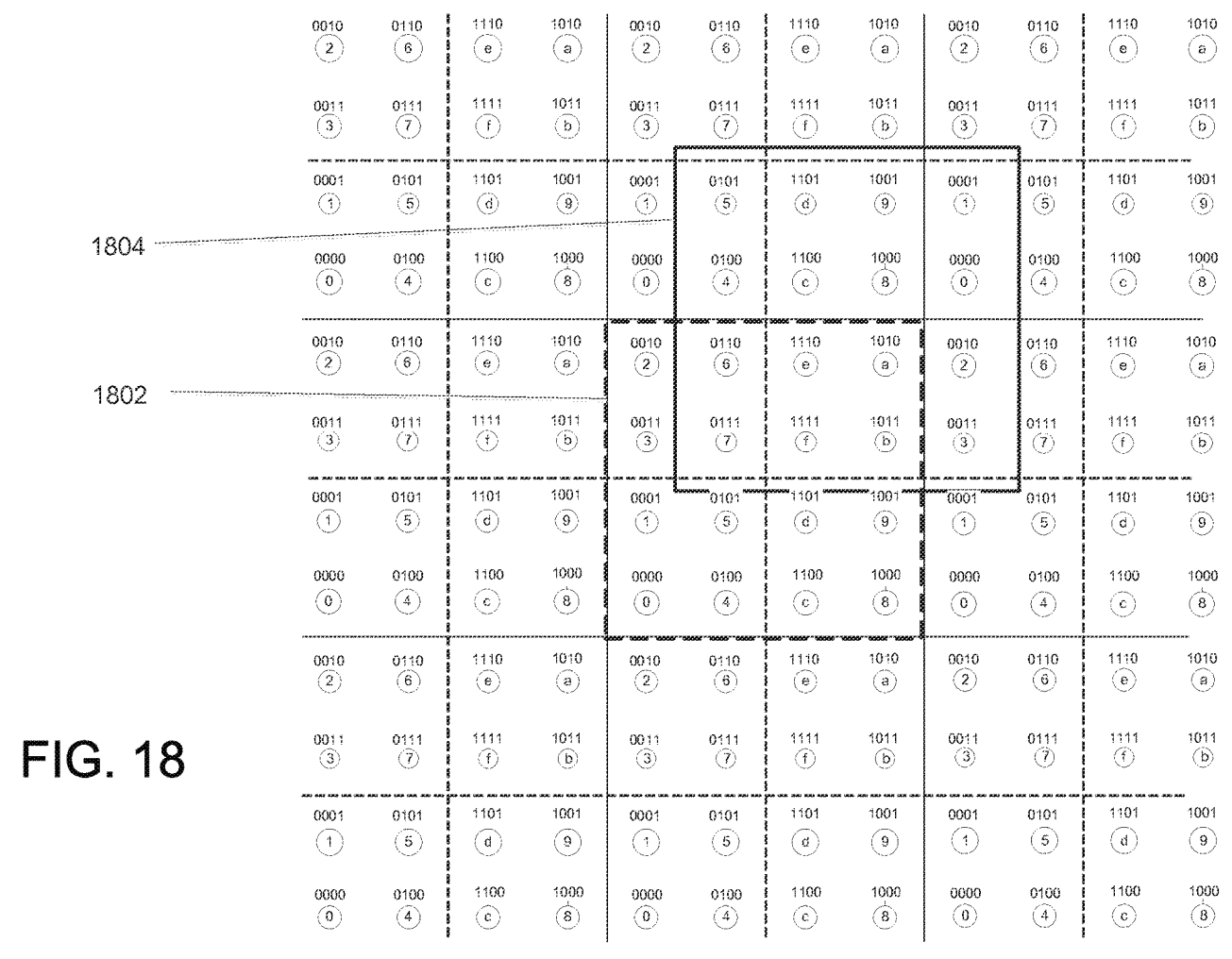

FIG. 18 illustrates an extended demapping signal constellation. As illustrated in FIG. 18, the square at 1802 may represent a 16QAM signal constellation and may have a symbol sets $\{S_{I,k}^0, S_{I,k}^1\}$, which may be further illustrated in FIG. 17.

Figure 19:
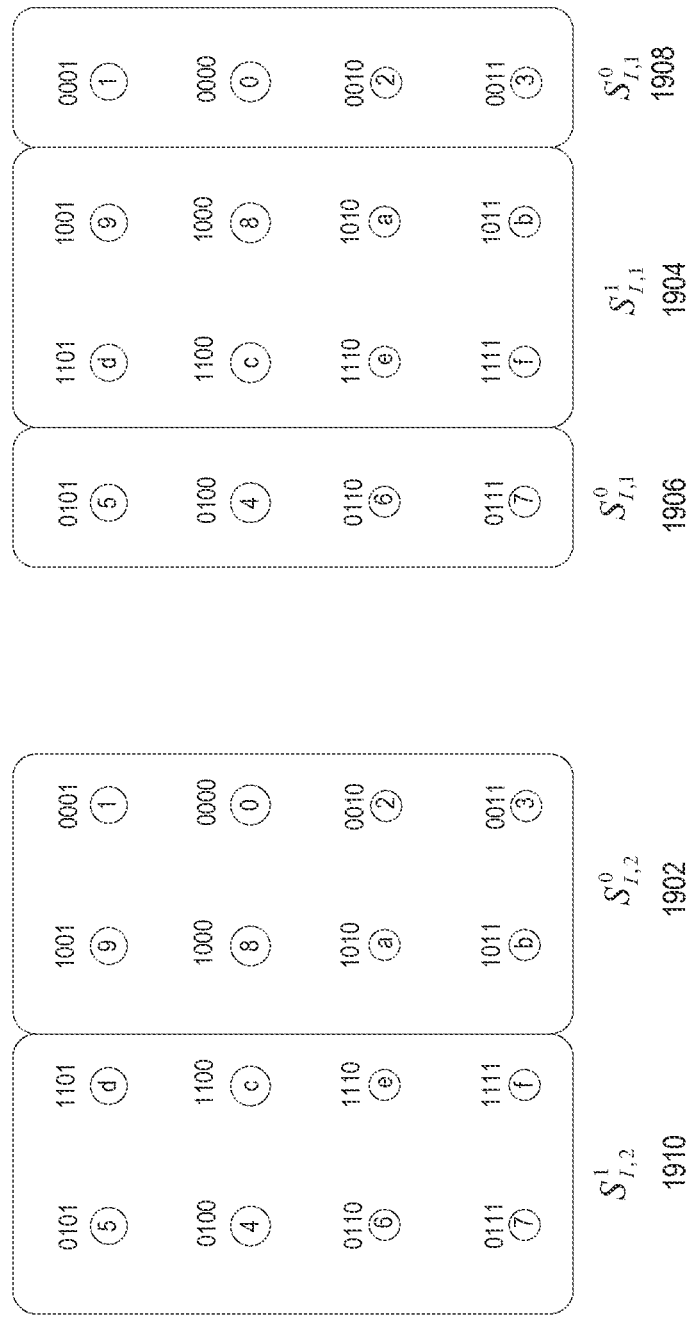
FIG. 19 illustrates an exemplary decision symbol sets of the shifted/wrapped signal constellation.

Referring again to FIG. 18, a received signal may be within the square at 1804 before a modulo operation and the constellation at 1804 may used. The decision symbol sets $\{S_{I,k}^0, S_{I,k}^1\}$ may change. For example, the decision symbol may be changed from the decision symbol sets in FIG. 17 to FIG. 19. FIG. 19 illustrates an exemplary decision symbol sets of the shifted/wrapped signal constellation. Although a difference may be seen in the I-branch, the decision symbol set $\{S_{Q,k}^0, S_{Q,k}^1\}$ may also be different. Additionally, the I-branch and Q-branch may be orthogonal and may be treated independently. Although the methods herein may be discussed in terms of the I-branch, the methods herein may be applied to the Q-branch.

Referring again to FIG. 18, as the decision symbol sets $\{S_{I,k}^0, S_{I,k}^1\}$ change, the expressions of the max-log-MAP soft bit LLRs may change. For example, if y may be the equalized signal on the I and/or Q branch with scaling, the demapping may include one or more of the following. A signal constellation mapping that may be used to calculate max-log-MAP soft bit LLRs may be decided. The signal constellation mapping may be a circularly wrapped and shifted version of an original constellation mapping. The signal constellation mapping may depend on the value of an equalized signal.

Depending on the value of the equalized signal y, an offseted signal z may be formed (e.g., properly) as:

z=y when $-1\leq y\leq 1$,
z=y-2 when $1\leq y\leq 3$,
z=y-4 when $3\leq y\leq 5$,
z=y-6 when $5\leq y\leq 7$,
z=y+8 when $-9\leq y\leq -7$,
z=y+6 when $-7\leq y\leq -5$,
z=y+4 when $-5\leq y\leq -3$,
z=y+2 when $-3\leq y\leq -1$,
. . . .

The offseted signal z may bring the equalized signal y to the origin. The center of the constellation labeling may be no longer the same as the constellation labeling in the original constellation. For example, center of 1804 may not be the center of 1802. The max-log-MAP bit decision may be performed using the offseted signal z and the signal constellation. Example soft bit LLRs may be illustrated in Table 1. For example. Table 1 may illustrate exemplary 16 QAM max-log-MAP soft bit LLRs.

As shown in Table 1, $D_1^A$ and $D_2^A$ may be the max-log-MAP soft bit LLRs for the first and second bit with the original signal constellation labeling. With different equalized signals (and different offsets), the soft bit LLRs may be sign-flipped and position-flipped.

Similar max-log-MAP soft bit LLRs may be carried out for 64QAMs. For example, depending on the value of the equalized signal, a signal constellation mapping that may be used to calculate max-log-MAP soft bit LLRs may be decided. The signal constellation mapping may be a circularly shifted version of an original constellation mapping. Depending on the value of the equalized signal y, the offseted signal z may be formed as:

z=y when $-2\leq y\leq 2$,
1, z=y-42 when $21\leq y\leq 6$,
3, z=y-84 when $63\leq y\leq 10$,
5, z=y-126 when $105\leq y\leq 14$,
7, z=y+168 when $-189\leq y\leq -14$,
7, z=y+126 when $-147\leq y\leq -10$,
z=y+8 when $-10\leq y\leq -6$,
5, z=y+4 when $-65\leq y\leq -3$, z=y+2 when $-3\leq y\leq -2$.

The offseted signal z may bring the equalized signal y to center of the constellation. The max-log-MAP bit decision may be performed using the offseted signal z and the signal constellation. The soft bit LLRs in this case may be illustrated in Table 2, which may illustrate exemplary 64 QAM max-log-MAP soft bit LLRs.

TABLE 2

| | Region 1 | Region 2 | Region 3 | Region 4 |
|---|---|---|---|---|
| | $-2 \leq y \leq 2$ | $2 \leq y \leq 6$ | $6 \leq y \leq 10$ | $10 \leq y \leq 14$ |
| | z = y | z = y - 4 | z = y - 8 | z = y - 12 |
| | $-18 \leq y \leq -14$ | $-14 \leq y \leq -10$ | $-10 \leq y \leq -6$ | $-6 \leq y \leq -2$ |
| | z = y + 16 | z = y + 12 | z = y + 8 | z = y + 4 |
| 1st bit LLR | $D_1^A$ | $D_2^A$ | $-D_1^A$ | $-D_2^A$ |
| 2nd bit LLR | $D_2^A$ | $-D_1^A$ | $-D_2^A$ | $D_1^A$ |
| 3rd bit LLR | $D_3^A$ | $-D_3^A$ | $D_3^A$ | $-D_3^A$ |

For 64QAM extended demapper, depending on whether it is in region 1, 2, 3, or 4, 1st bit LLR and 2nd bit LLR of the extended demapper may be approximated by one of the following values:

$$\{D_1^A, -D_1^A, D_2^A, -D_2^A\}$$

The 3rd bit LLR of the extended demapper may be approximated by one of the following values:

$$\{D_3^A, -D_3^A\}$$

TABLE 1

| | Region 1 | Region 2 | Region 3 | Region 4 |
|---|---|---|---|---|
| Equalized signal | $-1 \leq y \leq 1$ | $1 \leq y \leq 3$ | $3 \leq y \leq 5$ | $5 \leq y \leq 7$ |
| Offseted signal | z = y | z = y - 2 | z = y - 4 | z = y - 6 |
| Equalized signal | $-9 \leq y \leq -7$ | $-7 \leq y \leq -5$ | $-5 \leq y \leq -3$ | $-3 \leq y \leq -1$ |
| Offseted signal | z = y + 8 | z = y + 6 | z = y + 4 | z = y + 2 |
| D1 | $D_1^A = z$   D2 | $-[z]$   D1 | $-[z]$   D2 | z |
| D2 | $D_2^A = -|z| + 2$   D1 | $-|z| + 2$   D2 | $-[-|z| + 2]$   D1 | $-[-|z| + 2]$ |
| 1st bit LLR | $D_1^A$ | $D_2^A$ | $-D_1^A$ | $-D_2^A$ |
| 2nd bit LLR | $D_2^A$ | $-D_1^A$ | $-D_2^A$ | $D_1^A$ |

For 16QAM extended demapper, depending on whether it is in region 1, 2, 3, or 4, 1st bit LLR and the 2nd bit LLR of the extended demapper may be approximated by one of the following values:

$$\{D_1^A, -D_1^A, D_2^A, -D_2^A\}$$

Downlink signaling may be provided. A receiver may have knowledge of the scalar G (e.g., a real-valued number) to scale and/or equalize a signal before demapping the signal. For example, in a multi-carrier scenario, each sub-carrier may have a scalar G. The scalar G may differ from one user to another. Downlink signaling may be implicit or explicit.

Figure 20:
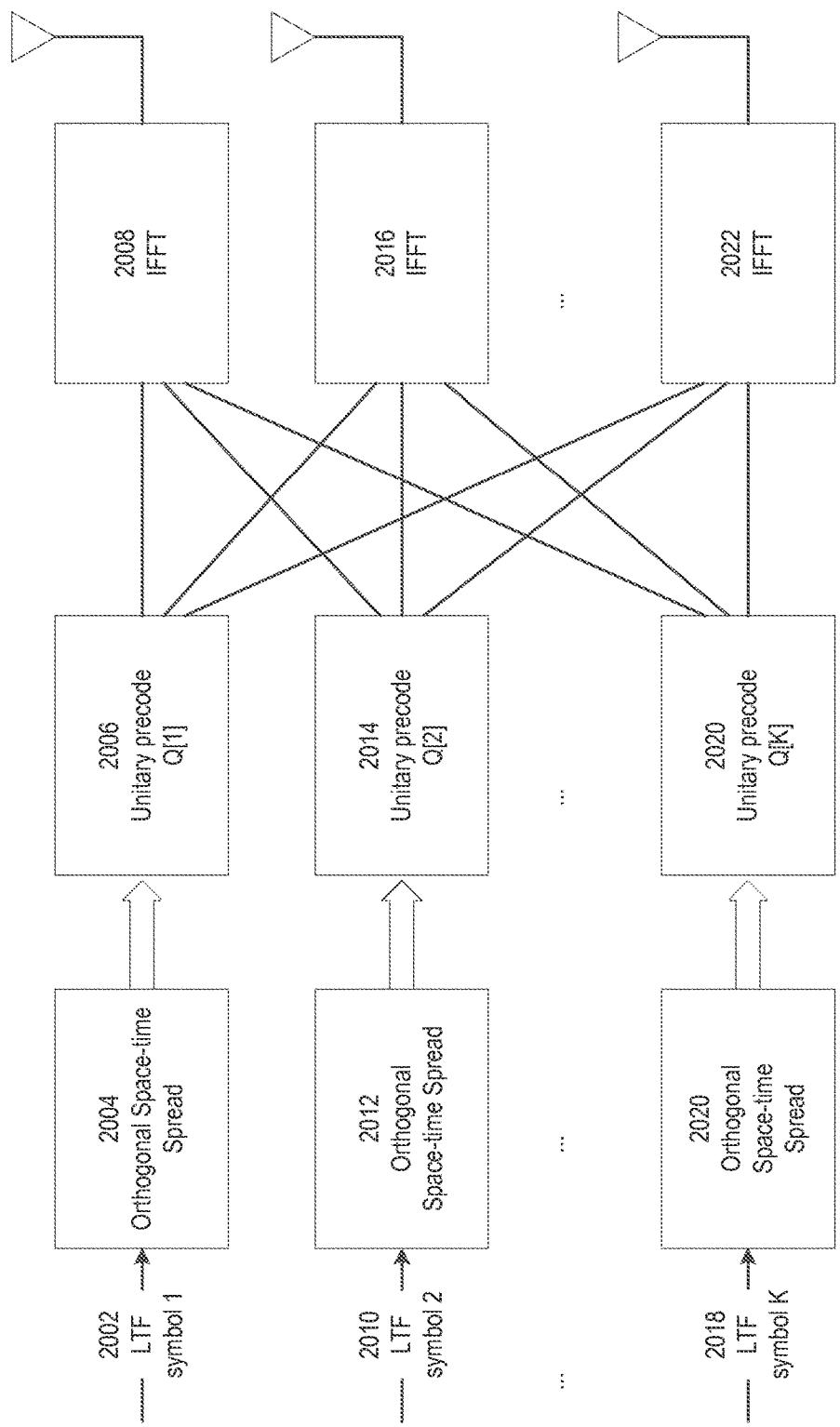
FIG. 20 illustrates an exemplary transmitter diagram for matched filtering implicit signaling.

FIG. 20 illustrates an exemplary transmitter diagram for matched filtering implicit signaling. In implicit downlink signaling, the AP may send out a set of precoded long training fields (LTFs) (e.g., linearly precoded LTFs). Users (e.g., STAs) may receive the LTFs and may detect the scalar G for one or more data frequencies in the LTF. The LTF sequence may be known by the STAs.

LTFs may be used by the transmitter to enable channel estimation at the receiver side. For QR-MU-MIMO, channel estimation may not be performed. The LTFs may be used to carry downlink signaling.

LTF may be generated at the AP. For example, precoded LTFs may be generated by using a sequence such as a length-Nf 802.11n/ac LTF sequence, a low peak-to-average-power ratio (PAPR) sequence, and the like. The sequence may vary based on the system bandwidth. For example, LTF-28-28 may be used for 20 MHz transmissions, LTF-58, 58 may be used for 40 MHz transmissions, etc. For example, the sequence, LTF-28,28={1, 1, 1, −1, −1, 1, 1, −1, 1, −1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, −1, −1} and the sequence, LTF-58,58={1, 1, −1, −1, 1, 1, −1, 1, −1, 1, 1, 1, 1, 1, 1, −1, −1, 1, 1, −1, 1, −1, 1, 1, 1, 1, 1, 1, −1, −1, 1, 1, −1, 1, −1, 1, −1, 1, −1, −1, −1, −1, −1, 1, 1, −1, −1, 1, −1, 1, −1, 1, 1, 1, 1, −1, −1, −1, 1, 0, 0, 0, −1, 1, 1, −1, 1, 1, −1, −1, 1, 1, −1, 1, −1, 1, 1, 1, 1, 1, 1, −1, 1, −1, 1, −1, 1, 1, 1, 1, 1, −1, −1, 1, 1, −1, 1, −1, 1, −1, −1, −1, −1, −1, 1, 1, −1, −1, 1, −1, 1, −, 1, 1, 1, 1}. The sequence length, Nf may depend on the number of data sub-carriers as part of the system design.

Elements of the sequence may be multiplied by an Nt×Ns matrix P to create a three dimensional matrix (e.g., space-time-frequency matrix). The LTF sequence may span the frequency domain, and the matrix P may span the space and the time domains. A row of the P matrix may spread the LTF sequence to one or more layers of MU-MIMO transmission. A column of the P matrix may spread the LTF sequence to one or more LTF symbols in the time domain. For example, orthogonal space-time spread 2004, 2012, 2020 may be used to spread the LTF symbol 2002, 2010, and/or 2018 in the time domain.

The dimension of this matrix P may be selected according to the number of users in a downlink. For example, P2×2 may be used for 2 users in a 2-transmit antenna setup, while P4×4 may be used for 3 or 4 users in a 4-transmit antenna setup.

$$P_{2\times 2} = \begin{bmatrix} 1 & -1 \\ 1 & 1 \end{bmatrix}$$

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

In the 4×4 example, P(1,1), P(1,2) P(1,3), P(1,4) may be the four symbols that may be transmitted on the four layers (e.g., at the same time). P(1,1), P(2,1) P(3,1), P(4,1) may be the four symbols on layer 1, e.g., in time slot 1, 2, 3, and/or 4. Other orthogonal P matrix such as a Hadamard matrix may be used. The orthogonally spread LTF sequence may be precoded by a unitary matrix Q. For example, output from orthogonal space-time spread 2004, 2012, and/or 2020 may be precoded by unitary precode 2006, 2014, and/or 2020. The unitary precoder may be obtained from QR decomposition of the channel matrix on the particular sub-carrier, and may be obtained after user ordering. The unitary precoder Q matrix may be channel dependent. The unitary precoder Q may be frequency dependent. IFFT output may be generated at 2008, 2016, and/or 2022 by performing IFFT operation on the precoded LTF sequence for each of the subcarriers.

A participating STA may estimate its own scaling parameter G on one or more of the subcarrier. The STA may use blind detection to estimate its scaling parameter G. For example, using a 4×4 (e.g., 4 transmit antennas to serve 4 users at the same time). This may be generalized for number of antennas or number of users.

For each subcarrier, a channel H may be written as:

$$H' = QR \Rightarrow H = LQ'$$

where L may be lower triangular, Hermitian transpose of the upper-triangular matrix R.

The received signal (e.g., ignoring subcarrier index) may be written as:

$$Y = HQPs + n = LPs + N$$

where may be the LTF symbol on the subcarrier and N may be additive white Gaussian noise. In this example, the dimensions of Y, H, Q, and P may be 4×4. With Y a 4×4 matrix $$Y = \begin{bmatrix} y11 & y12 & y13 & y14 \\ y21 & y22 & y23 & y24 \\ y31 & y32 & y33 & y34 \\ y41 & y42 & y43 & y44 \end{bmatrix}$$

The first STA may receive y11, y12, y13 and y14 over time slot 1, 2, 3, and 4 for a subcarrier. The second STA may receive y21, y22, y23, y24 over time slot 1, 2, 3, and 4 for the subcarrier. The third STA may receive y31, y32, y33 and y34 over time slot 1, 2, 3, and 4 for the subcarrier. The fourth STA may receive y41, y42, y43, y44 over time slot 1, 2, 3, and 4 for the subcarrier.

The STAs may perform the same matched filtering by multiplying the P' matrix to the received symbols $$Z = YP' = LPP's + NP' = Ls + NP'$$

$$L = \begin{bmatrix} l_{11} & 0 & 0 & 0 \\ l_{12} & l_{22} & 0 & 0 \\ l_{13} & l_{23} & l_{33} & 0 \\ l_{14} & l_{24} & l_{34} & l_{44} \end{bmatrix}$$

The diagonal entries of the matrix L may be real-valued numbers, the upper-triangular entries of L may be 0, and the lower-triangular entries of L may be complex-valued numbers. Because of the orthogonality of the matrix P', the noise NP' may not be amplified as compared to the noise N. After matched filtering on the subcarriers, the filter outputs Z may be written as the original LTF symbol s multiplied by the lower-triangular matrix L. Since G=Inverse(Diag(Diag(L))), the diagonal entries of the matrix L may be estimated.

Users may not know which row of Z they may be receiving, which may be due to independent user ordering. Such information may be obtained by using the structure of the lower triangular matrix L.

Each of the STAs may perform a blind detection with the matched filter output $\{zi1, zi2, zi3, zi4\}$, where i may be the row index to be detected on the particular subcarrier. A STA may use matched filter output {zi1, zi2, zi3, zi4} to perform a blind detection via hypothesis testing.

For example, a STA may be user 1 on a subcarrier if without noise, zi1 may be real (e.g., imaginary part of zi1 is zero); zi2 may be zero (e.g., real and imaginary parts of zi2 may be zeros); zi3 may be zero (e.g., real and imaginary parts of zi3 may be zeros); and/or zi4 may be zero (e.g., real and imaginary parts of zi4 may be zeros). As another example, a STA may be user 2 on this subcarrier, without noise, zi1 may be complex (e.g., imaginary part of zi1 may be nonzero); zi2 may be real (e.g., imaginary part of zi2 may be zero); zi3 may be zero (e.g., real and imaginary parts of zi3 may be zeros); and zi4 may be zero (e.g., real and imaginary parts of zi4 may be zeros). As another example, a STA may be user 3 on the subcarrier if, without noise, zi1 may be complex (e.g., imaginary part of zi1 may be nonzero); zi2 may be complex (e.g., imaginary part of zi2 may be nonzero); zi3 may be real (e.g., imaginary part of zi3 may be zero); and zi4 may be zero (e.g., real and imaginary parts of zi4 may be zeros). As another example, the STA may be user 4 on the subcarrier if, without noise, zi1 may be complex (e.g., imaginary part of zi1 may be nonzero); zi2 may be complex (e.g., imaginary part of zi2 may be nonzero); zi3 may be complex (e.g., imaginary part of zi3 may be nonzero); and zi4 may be zero real (e.g., imaginary part of zi4 may be zero).

The STA may blindly detect the row index (e.g., corresponding to user ordering) on a subcarrier, for example, by analyzing the real parts and imaginary parts of matched filter output {zi1, zi2, zi3, zi4}.

The STA may estimate the diagonal entry of L by incorporating the row index info (e.g., user ordering info) obtained from blind decoding with the matched filter output. The STA may estimate the value G by inverting the diagonal entry of the matrix L.

The blind detection and estimation may be repeated for the sub-carriers and for the STAs (e.g., independently). Sub-carrier ordering may be grouped together at the AP to improve the detection probability at the receiver.

Implicit signaling may be used to allow a STA to determine a scalar G. LTFs may be non-linearly precoded. The STAs may estimate its effective channel $l_{ii}$ (e.g., independently of the cross-talk from each of the channels). The AP may use similar LTFs for the users.

For example, in case of two users, for a specific subcarrier, the received signal (e.g., effective received signal) for a STA may be modeled after QR-MU-MIMO precoding as:

$$\begin{bmatrix} y_1 \\ y_2 \end{bmatrix} = \begin{bmatrix} l_{11} & 0 \\ l_{12} & l_{22} \end{bmatrix} \begin{bmatrix} s_1 \\ s_2 \end{bmatrix} + \begin{bmatrix} n_1 \\ n_2 \end{bmatrix}$$

where $y_i$ may be the signal received at STA i and $s_i$ is the effective pilot signal used by STA i to estimate the channel. The effective channel, $l_{ii}$ may be estimated independent of the cross talk $l_{ij}$. For a LTF sequence s, $s_i$ may be set such that the effective channel seen by STA i, may be:

$$y_i = l_{ii}s + n_i$$

which may enable the STA to estimate the effective channel as:

$$\hat{l}_{ii} = \frac{y_i}{s}$$

In the exemplary two user case, $$y_1 = l_{11}s_1 + n_1 \Rightarrow s_1 = s$$

$$y_2 = l_{12}s_1 + l_{22}s_2 + n_2 = l_{22}s \Rightarrow s_2 = \frac{(l_{22} - l_{12})}{l_{22}}s$$

For a large number of STAs, the channel may be generalized. The vector S may be normalized to satisfy the power requirements of the transmitter. The modulo for the duration of the LTF transmission may be removed.

LTF signal generation and/or channel estimation may include one or more of the following. The precoded LTFs may be generated by using a length-Nf 802.11n/ac LTF sequence a low peak-to-average-power ratio (PAPR) sequence, or the like. The sequence may vary based on the system bandwidth. For example, LTF-28-28 may be used for 20 MHz transmissions, LTF-58, 58 may be used for 40 MHz transmissions, etc. For example, the sequence, LTF-28, 28={1, 1, 1, 1, −1, −1, 1, 1, −1, 1, −1, 1, 1, 1, 1, 1, −1, −1, 1, 1, −1, 1, −1, 1, 1, 1, 1, 0, 1, −1 −1, 1, 1, −1, 1, −1, 1, −1, −1, −1, −1, 1, 1, −1, −1, 1, −1, 1, −1, 1, 1, 1, 1, −1, −1} and the sequence, LTF-58,58={1, 1, −1, −1, 1, 1, −1, 1, −1, 1, 1, 1, 1, 1, 1, −1, −1, 1, 1, −1, 1, −1, 1, 1, 1, 1, 1, 1, −1, −1, 1, 1, −1, 1, −1, 1, −1, −1, −1, −1, −1, 1, 1, −1, −1, 1, −1, 1, −1, 1, 1, 1, 1, −1, −1, 1, −1, 1, 1, 1, 1, −1, −1, 1, 0, 0, 0, −1, 1, 1, −1, 1, 1, −1, 1, −1, 1, −1, 1, 1, 1, 1, 1, −1, −1, 1, 1, 1, 1, 1, −1, −1, 1, 1, −1, 1, −1, 1, 1, 1, −1, 1, 1, 1, 1, 1, −1, −1, 1, 1, −1, −1, 1, 1, −1, 1, −1, 1, −1, −1, −1, −1, −1, 1, 1, −1, −1, 1, −1, 1, −1, 1, 1, 1, 1}. The sequence length. Nf may depend on the number of data sub-carriers as part of the system design.

The NL-MU-MIMO precoding order may be decided. For STAs 2, . . . , n, for example, the LTF may be pre-distorted, as shown in the equations, to enable the STAs to estimate their effective channel free of crosstalk. The normalization factor may be calculated to satisfy transmit power requirements. A modified SIG-A may be sent with a normalization factor. A normalization factor may be sent for each of the sub-carriers. A normalization factor may be sent for each sub-carrier, which may incur overhead that may be a fraction (e.g., 1/N) of the overhead to send the data. Each STA may estimate its effective channel over the transmitted bandwidth. The LTF signal generation and channel estimation technique may be generalized where N, the number of STAs, may be greater than two.

Figure 21:
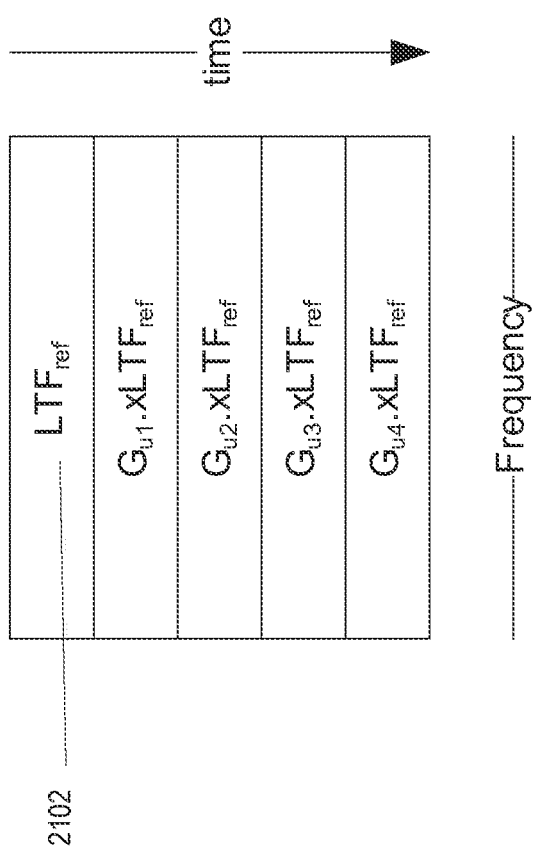
FIG. 21 illustrates an exemplary differential signaling.

Differential signaling may be used, e.g., instead of using blind detection for the determination of one or more parameters. FIG. 21 illustrates an exemplary differential signaling. As shown at 2102, an additional LTF may be used as a reference LTF. With the extra overhead of 1 LTF, a user may estimate G for each sub-carrier.

Generation of LTF may occur at the AP. A non-precoded LTF may be sent in the first OFDM symbol, which may be used as a reference LTF. The reference LTF may be followed by LTFs multiplied by Gu (1×nSC) for each user u. The LTF symbols may be multiplied by the scalar G in an element-wise fashion (e.g., each element may correspond to a frequency subcarrier). Instead of multiplied by the scalar G, a direct function of G may be used. (n+1) LTFs may be used for signaling to n users in a system that may employ differential signaling.

LTF ordering per user may use signaling of the order. The signaling may include, for example, incorporation of the parameter(s) as part of the VHT-SIG-B field, and/or SIG definition(s), e.g., a VHT-SIG-C field. The signaling may not be the per sub-carrier ordering, but may indicate which user may use which LTF to estimate G for each of the sub-carriers.

Figure 22:
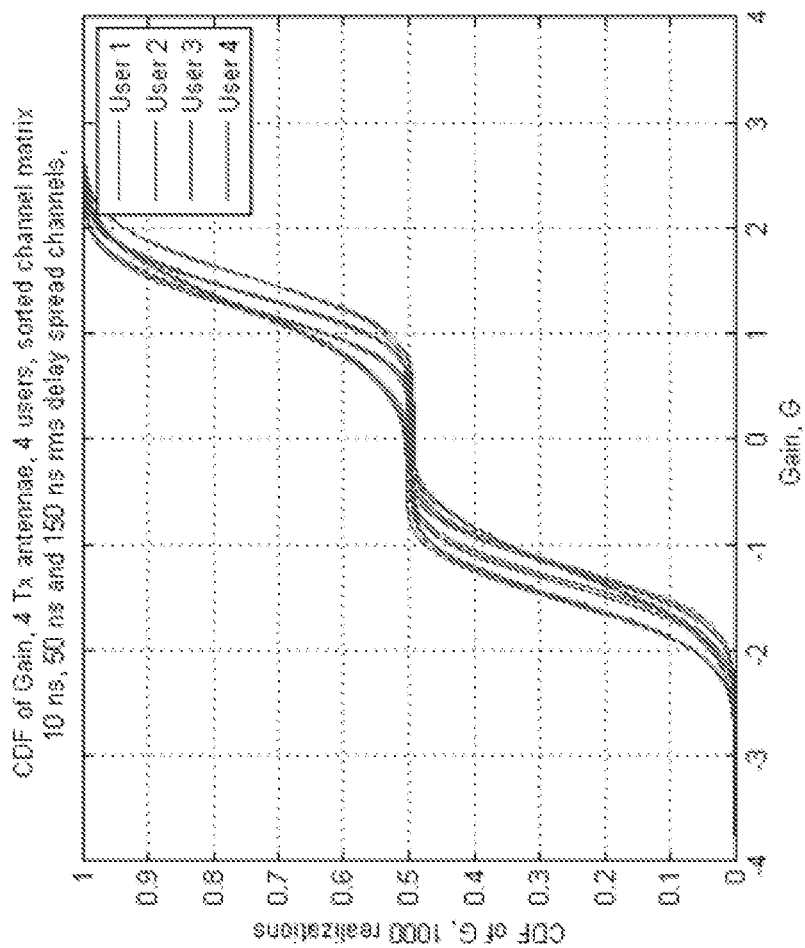
FIG. 22 illustrates an exemplary cumulative distribution function (CDF) distribution of the gains.

A STA procedure for estimation of a G may be provided. A STA may finds it's index, i, e.g., from the SIG or in a way it was transmitted. A STA may use the reference (e.g., 1st) and (i+1)th reference LTF to compute G for the sub-carrier using simple division: Gi(k)=LTF(i+1)(k)/LTF1(k), for each sub-carrier k. MMSE estimate may be used. The Gs may be used to decode the rest of the packet Transparent signaling may be provided. The LTFs may be precoded (e.g., non-linearly precoded) in a similar manner as for the data. For example, in a four user system with one receive antenna for each user, the SIG-A field in the pre-amble may label the users in an order. The four distinct LTFs may be labeled in the same order. User 1, for example, may use LTF 1 to estimate its parameters. At the AP, the user ordering per sub-carrier may be determined from the channel matrix. The user ordering may be applied to the LTFs, which may be non-linearly precoded. At a receiver, the user may decode its LTF to estimate its desired gain parameters. The received signal model for the ith user on the kth sub-carrier may be: $r_{ik}=G_{ik}(a_{ik}+v_{ik})+n_{ik}$ where $a_{ik}$ may be the known LTF symbol, $n_{ik}$ may be the additive noise and $v_{ik}$ may be the unknown additive element that may be due to the modulo operation at the transmitter. The gain $G_{ik}$ and $v_{ik}$ may be unknown and $G_{ik}$ may not be estimated from $r_{ik}$. $G_{ik}$ may be real, may be a function of the channel and sorting of the channel matrix on sub-carrier k, and may be bounded as illustrated in FIG. 22. FIG. 22 illustrates an exemplary cummulative distribution function (CDF) distribution of the gains. If the receiver has more than one LTF symbols, the ambiguity about $v_{ik}$ may be resolved and the gain $G_{ik}$ may be determined.

The scalar Gs may be signaled in the downlink. FIG. 23 illustrates an exemplary signaling frame format. As shown in FIG. 23, the signaling frame formal may include number of users 2302, user index 2304, quantization resolution 2314, signaling content 2306, user index 2308, quanization resolution 2310, and/or signaling content 2312. For a user, the real values (G) may be uniformly and/or non-uniformly quantized within a certain range and represented by binary bits. The binary signaling bits for a user may follow a user index (e.g., the STA address) control field and a quantization resolution control field.

Upon receiving the signaling frame, a user may identify its own user index (e.g., the STA address) and recover the signaling content that may follow.

In explicit downlink signaling, the LTFs may be generated a similar manner as in explicit signaling. Instead of relying on blind detection and estimation, explicit signaling may be used to signal the row index (e.g., user ordering) info for a subcarrier. The user ordering info may take lesser bits (e.g. 2 bit for a 4-user system) than direct signaling of the real-valued G.

With the user ordering explicitly signaled, a STA may directly proceed to estimate the diagonal entry of the matrix L and the corresponding Gs. The frame format of explicit signaling the user ordering index may be similar to frame format of explicit signaling of the real-valued Gs, described herein.

Figure 24A:
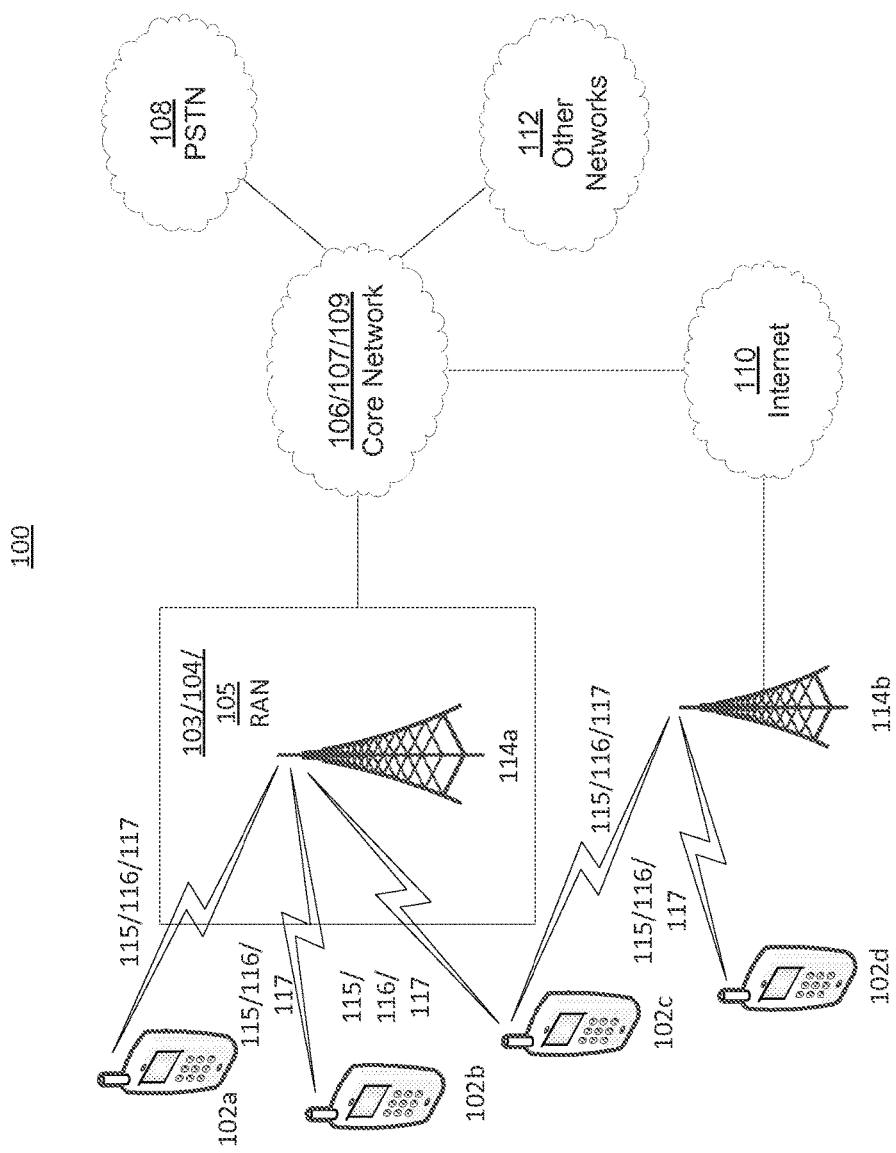
FIG. 24A is a system diagram of an example communications system in which one or more disclosed embodiments may be implemented.

FIG. 24A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 24A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a. 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 24A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 24A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 24A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 24A may be configured to communicate with the base station 114a, which may employ a cellular-based radio technology, and with the base station 114b, which may employ an IEEE 802 radio technology.

Figure 24B:
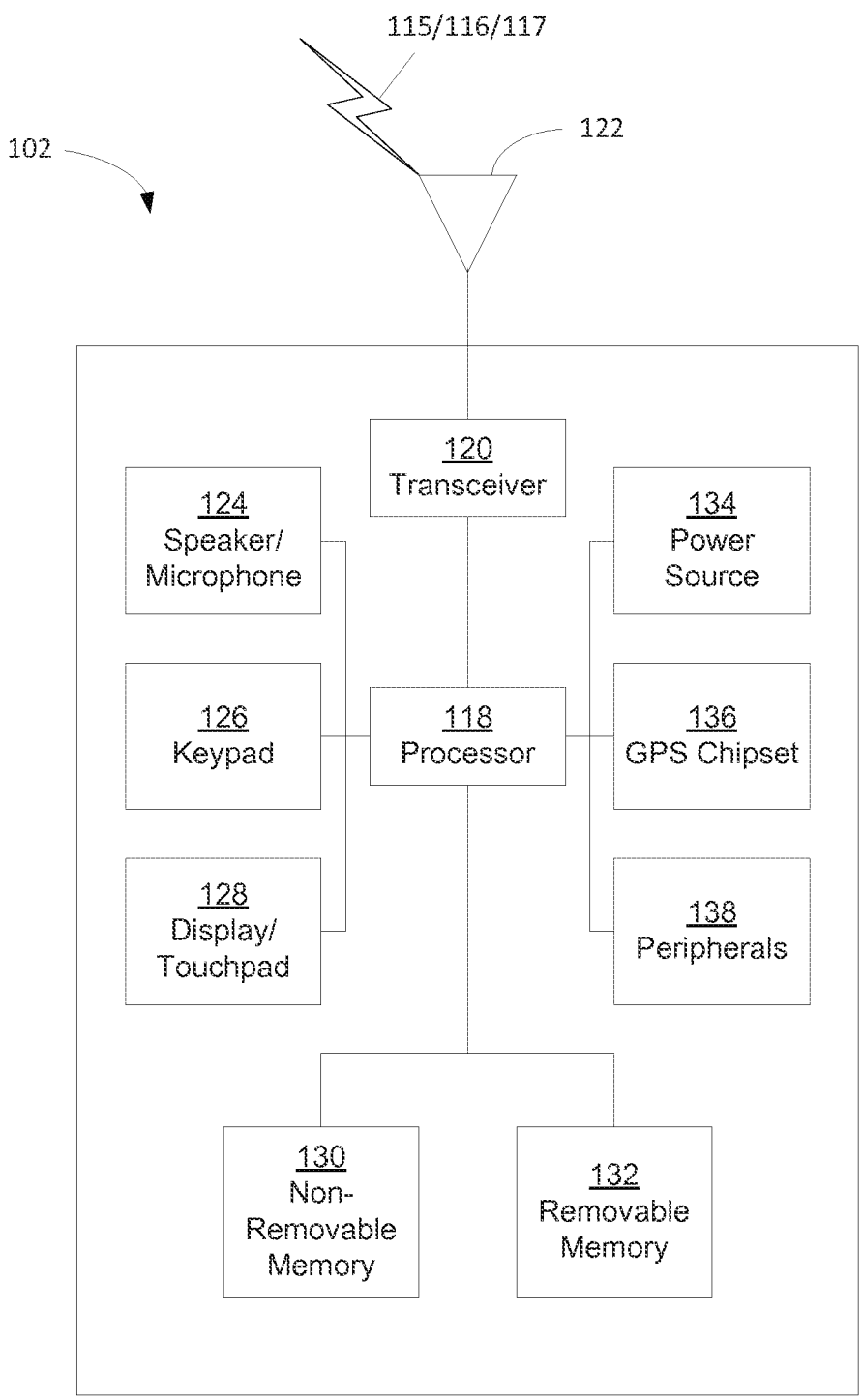
FIG. 24B is a system diagram of an example wireless transmit/receive unit (WTRU) that may be used within the communications system illustrated in FIG. 24A.

FIG. 24B is a system diagram of an example WTRU 102. As shown in FIG. 24B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or each of the elements depicted in FIG. 24B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 24B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/ receive element 122 may be configured to transmit and/or receive any combination of wireless signals.

In addition, although the transmit/receive element 122 is depicted in FIG. 24B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A station for multiuser multiple-input multiple-output (MU-MIMO) operation, the station comprising:
a memory; and
a processor configured to:
receive a channel estimation packet from a base station via a channel;
generate channel feedback using the channel estimation packet, wherein the channel feedback is associated with the channel and the channel feedback is capable of being used by the base station to generate matrix Q and matrix R (QR) dependent information and user ordering information associated with the station and at least one other station of the MU-MIMO operation, the user ordering information comprising an order in which the station and the at least one other station are processed, and wherein the QR dependent information comprises diagonal loading values and a modulo operation associated with the station that enables mapping of a signal within constellation boundaries;
send the channel feedback to the base station;
receive the QR dependent information and the user ordering information from the base station; and
receive non-linear precoded data from the base station.

2. The station of claim 1, wherein the user ordering information comprises a channel matrix of channel vectors from multiple stations.

3. The station of claim 2, wherein the processor is further configured to send data to the base station using the non-linear precoded data in an order indicated in the user ordering information.

4. The station of claim 1, wherein the QR dependent information comprises transmission characteristics.

5. The station of claim 1, wherein the processor is further configured to receive the QR dependent information via a code point included in a signal (SIG) field of a MU-MIMO procedure packet data unit (PPDU).

6. The station of claim 1, wherein the processor is further configured to receive the QR dependent information via a primary channel.

7. The station of claim 1, wherein the processor is further configured to receive the QR dependent information via a pilot signal.

8. The station of claim 1, wherein the processor is further configured to subtract, from the non-linear precoded data, cross-interference from one or more other stations.

9. The station of claim 1, wherein the processor is further configured to:
receive a multi-user data stream from the base station; and
apply the diagonal loading values and the modulo operation to the multi-user data stream.

10. The station of claim 9, wherein the processor is further configured to perform demapping and decoding.

11. The station of claim 1, wherein the processor is further configured to send an acknowledgement to the base station to acknowledge receipt of the received non-linear precoded data.

12. A base station configured for multiuser multiple-input multiple-output (MU-MIMO) operation, the base station comprising:
a memory; and
a processor configured to:
send a channel estimation packet;
receive a first feedback from a first station and a second feedback from a second station, the first station and the second station associated with the MU-MIMO operation;
determine matrix Q and matrix R (QR) dependent information and user ordering information using the first feedback and the second feedback, the user ordering information comprising an order in which the station and the at least one other station are processed, wherein the QR dependent information comprises diagonal loading values and a modulo operation associated with the first station and the second station that enables mapping of a signal within constellation boundaries, and wherein the user ordering information is associated with the first station and the second station;
send the QR dependent information to the first station; and
send a multi-user data stream using nonlinear precoding and the user ordering information.

13. The base station of claim 12, wherein the QR dependent information comprises transmission characteristics.

14. The base station of claim 12, wherein the processor is further configured to send the QR dependent information via a code point included in a signal (SIG) field of a MU-MIMO procedure packet data unit (PPDU).

15. The base station of claim 12, wherein the processor is further configured to send the QR dependent information via a primary channel.

16. The base station of claim 12, wherein the processor is further configured to send the QR dependent information via a pilot signal.

17. The base station of claim 12, wherein the processor is further configured to send the QR dependent information to the second station.

18. The base station of claim 12, wherein the user ordering information comprises a channel matrix of channel vectors for the first station and the second station.

19. The base station of claim 17, where in the processor is further configured to apply the diagonal loading values and the modulo operation to the multi-user data stream.

20. The base station of claim 12, wherein the processor is further configured to perform demapping and decoding.

* * * * *